United States Patent
Sakai

[19]

[11] Patent Number: 6,087,751
[45] Date of Patent: Jul. 11, 2000

[54] RELUCTANCE TYPE ROTATING MACHINE WITH PERMANENT MAGNETS

[75] Inventor: Kazuto Sakai, Tokyo, Japan

[73] Assignee: Kabushiki Kaisha Toshiba, Kawasakishi, Japan

[21] Appl. No.: 09/094,700

[22] Filed: Jun. 15, 1998

[30] Foreign Application Priority Data

| | | | |
|---|---|---|---|
| Jul. 1, 1997 | [JP] | Japan | 9-175383 |
| Oct. 31, 1997 | [JP] | Japan | 9-300956 |
| Oct. 31, 1997 | [JP] | Japan | 9-300994 |

[51] Int. Cl.$^7$ .................................................. H02K 21/12
[52] U.S. Cl. ........................ 310/156; 310/166; 310/168; 310/172; 310/191; 310/193; 310/216; 310/261
[58] Field of Search .................................... 310/156, 261, 310/216, 193, 168, 166, 172, 191

[56] References Cited

U.S. PATENT DOCUMENTS

| | | | |
|---|---|---|---|
| 5,063,318 | 11/1991 | Anderson | 310/156 |
| 5,097,166 | 3/1992 | Mikulic | 310/156 |
| 5,187,401 | 2/1993 | Rahman | 310/156 |
| 5,631,512 | 5/1997 | Kawabata et al. | 310/156 |
| 5,670,836 | 9/1997 | Horst | 310/156 |
| 5,679,995 | 10/1997 | Nagate et al. | 310/156 |
| 5,719,458 | 2/1998 | Kawai | 310/156 |
| 5,731,647 | 3/1998 | Schuller et al. | 310/114 |
| 5,753,985 | 5/1998 | Redlich | 310/36 |
| 5,760,520 | 6/1998 | Hasebe et al. | 310/261 |

FOREIGN PATENT DOCUMENTS 0 785 615   7/1997   European Pat. Off. .

OTHER PUBLICATIONS

"Electrical Machines for Variable–Frequency Drives" by Gordon R. Slemon, published in the Proceedings of the IEEE, vol. 82, No. 8, Aug., 1994, pp. 1123–1139.

D.A. Staton, et al. "Optimisation of the Synchronous Reluctance Motor Geometry", IEE Conf. Electr. Machines and Drives, London, (Sep. 1991), pp. 156–160.

Longya XU, et al., "A New Design Concept of Permanent Magnet Machine for Flux Weakening Operation", IEE IAS Annual Meeting, (1993), pp. 3–8.

Yukio Honda, et al., "Optimum Design of a Multi Layer Interior Permanent Magnet Synchronous Motor Using Reluctance Torque", Transactions of IEE of Japan, vol. 117-D, No. 7, (1997), pp. 898–904.

M.J. Kamper, et al., "Effect of Rotor Dimensions and Cross Magnetisation on $L_d$ and $L_q$ Inductances of Reluctance Synchonous Machine with Cageless Flux Barrier Rotor", IEE Proc. Elect. Power Appl., vol. 141, No. 4, (1994), pp. 213–220.

Patent Abstracts of Japan, vol. 098, No. 004, Mar. 31, 1998, JP 09 331661, Dec. 22, 1997.

Patent Abstracts of Japan, vol. 096, No. 009, Sep. 30, 1996, JP 08 126273, May 17, 1996.

Patent Abstracts of Japan, vol. 097, No. 002, Feb. 28, 1997, JP 08 256456, Oct. 1, 1996.

Patent Abstracts of Japan, vol. 097, No. 011, Nov. 28, 1997, JP 09 201022, Jul. 31, 1997.

*Primary Examiner*—Nestor Ramirez
*Assistant Examiner*—Thanh Lam
*Attorney, Agent, or Firm*—Oblon, Spivak, McClelland, Maier & Neustadt, P.C.

[57] ABSTRACT

A reluctance type rotating machine includes a stator having armature windings arranged on an inner periphery of the stator, a rotor having projection portion forming magnetic poles, and a plurality of permanent magnets arranged on both side faces of the projection portions. Owing to the provision of the permanent magnets, it is possible to restrain magnetic fluxes of the armature windings of the stator from leaking toward interpole portions between the magnetic poles. The power output of the machine can be improved by increased effective fluxes.

56 Claims, 22 Drawing Sheets

FLUX OF ARMATURE WINDINGS

FLUX OF PERMANENT MAGNET

FLUX

RELUCTANCE TYPE ROTATING MACHINE WITH PERMANENT MAGNETS

BACKGROUND OF THE INVENTION

1. Field of the Invention

The present invention relates to a reluctance type rotating machine having permanent magnets, which is compact and capable of rotating at high speed and high outputs.

2. Discussion of Background

Recently, electric propulsion systems such as a hybrid automotive vehicle, an electric vehicle and an electric rail car has rapidly been developed. These electric propulsion systems require a wide range variable is speed operation property, high efficiency and reliability in high temperature. A permanent magnet type rotating machine has been used for the electric propulsion system because of its wide range variable speed operation property at constant torque operation and high output property and high efficiency in wide speed range. However, the efficiency of the permanent magnet type rotating machine is deteriorated at low load operation. In view of these circumstances, lots of engineers are paying attention to a reluctance type rotating machine.

As shown in FIG. 1, a reluctance type rotating machine comprises a stator 1 having armature windings 2 and a rotor 3 having an uneven core 4 since the rotating machine does not require coils for forming a field system about the rotor 3. Therefore, the reluctance type rotating machine is simple in structure and low in price.

Because of unevenness of the rotor 3, the reluctance type rotating machine exhibits small magnetic reluctance at projection portions 5 of the rotor 3 and large magnetic reluctance at recess portions 6. That is, there is a difference between magnetic energy stored about a gap over the projection portion 5 and the magnetic energy stored about another gap over the recess portion 6. Note, the magnetic energy can be stored by sending an electric current to the armature windings 2. Owing to this difference in magnetic energy, the rotating machine can produce power output.

Meanwhile, although both the projection portion 5 and the recess portion 6 are geometrical elements in the shown rotating machine, the rotor 3 may be modified so as to have magnetic unevenness, for example, different magnetic reluctance or different magnetic flux density distributions depending on positions in the rotor.

As another high-performance rotating machine, there exists a permanent magnet type rotating machine. Although this rotating machine includes armatures similar to that of the reluctance type rotating machine, a rotor is provided, on the whole periphery of a core, with permanent magnets.

Due to the unevenness on the core, the reluctance type rotating machine has different magnetic reluctance depending on rotational positions of the rotor. With the change of the magnetic reluctance, the magnetic energy also varies to produce the output power.

In the conventional reluctance type rotating machine, however, the increasing of currents causes a locational magnetic saturation to be enlarged at the projection portions 5. Thus, the enlarged magnetic saturation also causes magnetic fluxes leaking to the recess portions 6 between poles to be increased, so that effective fluxes are decreased while lowering the output power.

On the other hand, as another high-powered rotating machine, there is a permanent magnet type rotating machine using "rare metal" permanent magnets exhibiting high magnetic energy products. However, since the permanent magnets have to be disposed on the whole surface of a rotor core, the rotating machine requires a great number of permanent magnets, disadvantageously.

Moreover, in the permanent magnet type rotating machine, there is a problem that interlinkage fluxes to an armature increase to make iron loss increased at low load operation.

SUMMARY OF THE INVENTION

It is therefore an object of the present invention to provide a reluctance type rotating machine which is compact and is capable of generating high power output by disposing permanent magnets.

Another object of the present invention is to provide a reluctance type rotating machine which can achieve a wide range variable speed property and high efficiency at low load operation range.

These object of the present invention described above can be accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent magnets arranged in the rotor so that magnetic fluxes of the permanent magnets repel flux of the armature windings leaking toward the interpole portions.

In the present invention, preferably, the rotor core has irregularities formed on a peripheral surface thereof on the side of the gap, the irregularities consisting of projection portions and recess portions, and each of the permanent magnets is arranged on each side face of the projection portions in the circumferential direction of the rotor.

Owing to the permanent magnets on the side faces of the projection portions, it is possible to restrain the magnetic fluxes of the armature windings of the stator from leaking to the recess portions between the opposing magnetic poles of the rotor and the side faces of the projection portions as the magnetic poles. In other words, by restraining the fluxes, it is possible to increase effective fluxes, whereby the high power output can be realized.

In the present invention, more preferably, the projection portions are connected, at respective outer peripheries thereof, with each other through an intermediary of bridge members made of magnetic material.

Since the permanent magnets are surrounded by the magnetic materials, it is possible to strongly fix the permanent magnets with the rotor core during the machine's rotating at even high speed, high or low temperature where it is difficult to fix the permanent magnets by adhesive agents. Further, since the permanent magnets are surrounded by the magnetic materials, it is possible to prevent the permanent magnets from irreversibly being demagnetized. Moreover, since the permanent magnets are surrounded by the magnetic materials, it is possible to reduce interlinkage fluxes to an armature of the stator because of a magnetic short circuit to reduce iron loss, so that the efficiency at low load or no load operation range can be improved.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core has irregularities formed on a peripheral surface thereof on the side of the gap, the irregularities consisting of projection portions and recess portions, and the permanent magnets are respectively accommodated in cavities formed in the projection portions, the cavities being positioned close to respective side faces of the projection portions in the circumferential direction of the rotor.

Also in this case, owing to the permanent magnets in the cavities of the projection portions, it is possible to restrain the magnetic fluxes of the armature windings of the stator from leaking to the recess portions between the opposing magnetic poles of the rotor and the side faces of the projection portions as the magnetic poles.

In this case, more preferably, the projection portions are connected, at respective outer peripheries thereof, with each other through an intermediary of bridge members made of magnetic material.

Similarly, since the permanent magnets are embedded in the cavities surrounded by the rotor core, it is possible to strongly fix the permanent magnets with the rotor core during the machine's rotating at even high speed, high or low temperature where it is difficult to fix the permanent magnets by the adhesive agents.

Further, since the permanent magnets are surrounded by the magnetic materials, it is possible to prevent the permanent magnets from irreversibly being demagnetized. Moreover, since the permanent magnets are surrounded by the magnetic materials, it is possible to reduce interlinkage fluxes to an armature of the stator because of magnetic short circuit to reduce iron loss, so that the efficiency at low load or no load operation range can be improved.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core includes a plurality of cavities formed along an outer peripheral surface of the rotor so that each of the magnetic poles is defined between two of the cavities, and the permanent magnets are accommodated in the cavities adjacent to the magnetic poles respectively.

Also in this case, owing to the permanent magnets in the cavities of the projection portions, it is possible to restrain the magnetic fluxes of the armature windings of the stator from leaking to the recess portions between the opposing magnetic poles of the rotor and the side faces of the projection portions as the magnetic poles.

In this case, more preferably, the cavities comprise a plurality of large cavities formed at respective centers of the interpole portions and a plurality of small cavities each formed between the magnetic pole and one of the large cavities to accommodate each of the permanent magnets therein.

Similarly, since the permanent magnets are accommodated in the small cavities surrounded by the rotor core, it is possible to strongly fix the permanent magnets with the rotor core during the machine's rotating at even high speed, high or low temperature where it is difficult to fix the permanent magnets by the adhesive agents.

Further, since the permanent magnets are surrounded by the magnetic materials, it is possible to prevent the permanent magnets from irreversibly being demagnetized. Moreover, since the permanent magnets are surrounded by the magnetic materials, it is possible to reduce interlinkage fluxes to an armature of the stator because of a magnetic short circuit to reduce iron loss, so that the efficiency at low load or no load-operation range can be improved.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core includes cavities formed along side faces of core portions defining the magnetic poles of the rotor, two of the cavities being arranged so as to form a V-shaped pattern in each of the interpole portions, and the permanent magnets are accommodated in the cavities, respectively.

Also in this rotating machine, it is possible to increase effective fluxes, whereby the high power output can be realized. Additionally, since the permanent magnets are embedded in the cavities in the V-shaped pattern, it is possible to strongly fix the permanent magnets with the rotor core during the machine's rotating at even high speed, high or low temperature where it is difficult to fix the permanent magnets by the adhesive agents.

Further, since the permanent magnets are surrounded by the magnetic materials, it is possible to prevent the permanent magnets from irreversibly being demagnetized. Moreover, since the permanent magnets are surrounded by the magnetic materials, it is possible to reduce interlinkage fluxes to an armature of the stator because of a magnetic short circuit to reduce iron loss, so that the efficiency at low load or no load operation range can be improved.

In the above-mentioned invention, preferably, the rotor core has additional cavities each formed at a center of the interpole portion interposed between the permanent magnets in the V-shaped pattern.

In this case, with the increased magnetic reluctance, it is possible to reduce the fluxes between the magnetic poles totally.

More preferably, the rotor core of the rotor has core portions formed on both sides of each of the permanent magnets for flowing magnetic fluxes.

In this case, the magnetic fluxes of each permanent magnet flow through the peripheral and center portions of the rotor core on both sides of the magnet in respective short circuits, so that the magnetic fluxes of each magnet can form substantially closed magnetic paths in the rotor core. Owing to the formation of shirt circuits, it is possible to reduce outside magnetic reluctance in aspects of the permanent magnets and also reduce opposite magnetic field applied on the permanent magnets while standing against demagnetization.

In the modification, the permanent magnets may be arranged in an inversed V-shaped pattern, viewed from a center of the rotor.

Also in this case, owing to the formation of shirt circuits, it is possible to reduce outside magnetic reluctance in aspects of the permanent magnets and also reduce opposite magnetic field applied on the permanent magnets while standing against demagnetization.

In common with the above-mentioned reluctance type rotating machines, it is preferable that the rotor core is made from laminated electromagnetic steel plates.

In this case, it is possible to reduce an eddy current produced in the rotor core.

In common with the above-mentioned reluctance type rotating machines, it is also preferable that the rotor core has a non-magnetic material accommodated in another cavity in which the permanent magnet is not accommodated.

In this case, it is possible to increase the strength of the rotor owing to the resultant solid structure.

More preferably, the non-magnetic materials are conductive of electricity.

When the rotating machine transitionally operates at asynchronous speed, the eddy current flows through the conductive non-magnetic materials, so that the rotor can rotate under a stable condition. Further, since a current for restraining harmonic current in the armature windings flows in the conductive non-magnetic materials, it is possible to reduce the influence due to harmonic current.

In common with the above-mentioned reluctance type rotating machines, preferably, each rotating machine further includes plural pairs of units each of which consists of the armature windings and a power element connected to the armature windings.

In this case, it is possible to replace a power element of large capacity with a great number of normal power elements of small capacities.

The object of the present invention described above can be also accomplished by a reluctance type rotating machine comprising:
- a stator having armature windings arranged on an inner periphery of the stator;
- a rotor arranged radially inward the stator through a gap, the rotor including a rotor core provided with magnetic poles and interpole portions between the magnetic poles; and
- a plurality of permanent arranged in the rotor so that magnetic fluxes of the permanent magnets repel flux of the armature windings leaking toward the interpole portions;
- wherein the rotor core includes a plurality of cavities formed along respective pole-axes of the magnetic poles, each of the cavities being oblong-shaped, and the permanent magnets are arranged in the cavities, respectively, the permanent magnets being magnetized in a manner that magnetic fluxes generated from the permanent magnets intensify each other in the interpole portions.

In the above-mentioned rotating machine, since the permanent magnets along the pole-axes are magnetized in the direction perpendicular to the pole-axes, the magnets operate to repel the fluxes invading from the directions of the interpole-axes. Further, since the relative permeability is approx. 1, the permanent magnets operate to enhance the magnetic reluctance in the directions of the permanent magnets. Thus, the fluxes due to the armature current flow the core portions at the magnetic poles without flowing through the interpole core portions, so that irregularities in the gap flux distribution is produced to generate a large torque by changes of magnetic energy. Note, when the rare earth permanent magnets of high magnetic energy product are employed for the permanent magnets, the gap field in the direction of the interpole-axis can be faced in the opposite direction to the magnetic fields due to the armature current, so that it is possible to increase the change in the distribution of gap flux density with respect to the rotational position of the rotor. Consequently, with the increased change of the distribution of gap flux density, namely, the increased change of magnetic energy, the power output of the machine can be improved. Additionally, since the permanent magnets are accommodated in the cavities along the pole-axes, the surface area of the permanent magnets is reduced in comparison with that of the conventional permanent magnet type rotating machine having the permanent magnets attached on the outer surface of the rotor and similarly, the amount of interlinkage fluxes is also reduced. The permanent magnets are surrounded by the magnetic material, the amount of interlinkage flux is reduced because of magnetic short circuit, so that iron loss can be reduced. The terminal voltage is induced by combining the interlinkage fluxes due to the permanent magnets with the interlinkage fluxes due to the armature current (exciting current component of reluctance motor and torque current component). This means that to adjust the exciting current component allows the terminal voltage to be adjusted in a wide range. That is, it is possible to operate the rotating machine at variable speeds within a wide range in spite of power source of constant-voltage.

The object of the present invention described above can be also accomplished by a reluctance type rotating machine comprising:
- a stator having armature windings arranged on an inner periphery of the stator;
- a rotor arranged radially inward the stator through a gap, the rotor including a rotor core provided with magnetic poles and interpole portions between the magnetic poles; and
- a plurality of permanent arranged in the rotor so that magnetic fluxes of the permanent magnets repel flux of the armature windings leaking toward the interpole portions;
- wherein the rotor core includes a plurality of first cavities formed along respective pole-axes of the magnetic poles, each of the cavities being oblong-shaped, and a plurality of second cavities formed radially inside the first cavities and disposed in the interpole portions, and the permanent magnets are arranged in the first cavities, respectively, the permanent magnets being magnetized in a manner that magnetic fluxes generated from the permanent magnets intensify each other in the interpole portions.

In addition to the above-mentioned effects, the magnetic reluctance in the directions of the interpole-axes is increased by the second cavities. Therefore, the fluxes due to the armature current flow the core portions at the magnetic poles without flowing through the interpole core portions. Consequently, since the irregularities in the gap flux distribution are produced, a large torque can be produced owing to the changes of magnetic energy.

In the above-mentioned reluctance type rotating machine, preferably, the second cavities are fan-shaped cavities each of which is formed so as to gradually widen from a base point thereof toward an outer periphery of the rotor core, the base point being close to a center of the rotor core.

In this case, owing to the shape of the cavities, it is possible to increase the magnetic reluctance, thereby increasing the torque of the machine.

Alternatively, it is also preferable that the second cavities are shaped to be oblong. In this case, since the first cavities are arranged in the multipole rotating machine polygonally, the oblong configuration of the second cavities allows a radial thickness of the rotor core to be increased, so that it is possible to enhance the magnetic reluctance in the radial direction of the rotor core effectively.

In common with the above-mentioned two reluctance type rotating machines, it is also preferable that the rotor core has non-magnetic materials accommodated in the second cavities, respectively.

Also in this case, it is possible to increase the strength of the rotor owing to the resultant solid structure.

More preferably, the non-magnetic materials are conductive of electricity.

Also in this case, repeatedly, when the rotating machine transitionally operates at asynchronous speed, the eddy current flows through the conductive non-magnetic materials, so that the rotor can rotate under a stable condition. Further, since a current for restraining harmonic current in the armature windings flows in the conductive non-magnetic materials, it is possible to reduce the influence due to harmonic-current.

In the above-mentioned rotating machine of the invention, preferably, the second cavities have additional permanent magnets accommodated therein, respectively.

In this case, the permanent magnets in the second cavities operate to repel the fluxes of the armature current entering along the interpole-axes, so that the irregularities in gap flux distribution is further increased to improve the power output of the machine.

In this arrangement, more preferably, the permanent magnets in the first cavities have high magnetic energy products, while the permanent magnets in the second cavities have low magnetic energy products.

It is noted that the closer it approach the outer periphery of the rotor, the more intensely the demagnetization field due to the armature reaction is distributed. Accordingly, by arranging the permanent magnets of high magnetic energy products in the first cavities along the periphery of the rotor, it is possible to increase the irregularities of gap flux distribution.

In the present invention, it is more preferable that the second cavities are formed in the rotor core so as to leave a part of the rotor core between each permanent magnet in the first cavity and each second cavity.

In such a case, the magnetic fluxes of the permanent magnets partially leak out through the parts of the rotor core, so that the diamagnetic field in the permanent magnets is minimized. Consequently, it is possible to raise an operative point on a demagnetizing curve of the permanent magnet while causing the permeance coefficient to be increased, so that the demagnetizing-proof characteristics against temperature and armature reaction can be improved.

It is also preferable that the permanent magnets in the first cavities are arranged in a manner that respective outside ends of the permanent magnets are inside an outer periphery of the rotor core, leaving a part of the rotor core between the gap and each of the outside ends of the permanent magnets.

Also in this case, the same operations and merits as above will be effected. Furthermore, when the rotor core is made from laminated electromagnetic steel plates, then the electrical resistance of the rotor core is enhanced, so that the eddy current due to the harmonic fluxes can be reduced advantageously.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core includes a plurality of first cavities formed along respective pole-axes of the magnetic poles, each of the first cavities being oblong-shaped, and a plurality of second cavities formed radially inside the first cavities and disposed in the interpole portions, and the permanent magnets are arranged in the second cavities, respectively.

Because of no magnets in the first cavities, the high magnetic reluctance of the first cavities is the only action to influence the armature fluxes. Thus, since the fluxes due to the armature current in the direction of interpole-axes increase, the changing range of the gap flux density is reduced and the power output of the machine is also lowered. However, with a reduction of the number of permanent magnets installed in the rotating machine, it is possible to reduce the manufacturing cost of the machine.

In addition, since the permanent magnets are secluded in the rotor core, the magnetic fluxes leaking into the rotor core are increased, so that the diamagnetic field of the magnets becomes smaller. Taking account of B—H property of a demagnetizing curve, the operative point can be raised since the magnetic paths of fluxes increase in parallel, whereby the rotor is magnetically stabilized thereby to become stronger against the demagnetization. Further, the more it approaches the outer periphery of the rotor, the more intensely the demagnetizing field due to the armature reaction is distributed. Thus, such an inmost positioning of the permanent magnets allows the influence of the armature reaction to be moderated. As a result, it is possible to prevent the demagnetization of permanent magnets due to temperature and armature reaction, whereby the stable characteristics of the machine can be obtained for a long term.

In the above-mentioned rotating machine, preferably, the permanent magnets in the second cavities are magnetized in a radial direction of the rotor core.

In this case, since each permanent magnet is magnetized in the opposite direction to the armature fluxes along the interpole axis, it is possible to reduce the gap fluxes in the directions of interpole-axes. Note, when the rare earth permanent magnets having high magnetic energy products are employed, it is possible to turn the gap fields in the directions of interpole-axes to the opposite directions to the magnetic fields due to the armature current, so that the change in gap flux density distribution, namely, the change in magnetic energy is increased thereby to improve the power output.

In common with the above-mentioned two reluctance type rotating machines, preferably, a width of each of the magnetic poles is 0.3 to 0.5 times as long as a pole pitch of the magnetic poles.

With the establishment, it is possible to increase the change in the distribution of gap flux density with respect to the rotational position of the rotor effectively, whereby the rotating machine of high power output can be realized.

In common with the above-mentioned two reluctance type rotating machines, preferably, the rotor core is provided, at respective centers of the magnetic poles, with slits extending in a radial direction of the rotor core.

In this case, since the magnetic reluctance in the direction of crossing the magnetic poles is increased by the slits, the fluxes due to the armature current in the directions of the interpole-axes are reduced. Further, since the fluxes of each permanent magnet in the cavity along the pole-axis is interrupted by one of the slits, the magnetic fluxes of the permanent magnet firstly flow in the direction along the cavity in the magnetic pole, secondly passes through the stator core via the gap and returns to the same magnet finally.

In common with the above-mentioned two reluctance type rotating machines, preferably, the rotor core is composed of laminated electromagnetic steel plates.

Also in the above-mentioned rotating machine, it is preferable that the non-magnetic materials are accommodated in the first cavities.

In this case, it is possible to increase the strength of the rotor owing to the resultant solid structure.

Also in this case, more preferably, the non-magnetic materials are conductive of electricity.

In this case, the eddy current generated in the materials allows to rotating machine to be self-activated. Further, it is possible to reduce the influence of harmonic magnetic field.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core has a plurality of first cavities formed along respective pole-axes of the magnetic poles and a plurality of second cavities formed along outer peripheries of the interpole portions, the first and second cavities being oblong-shaped, and the permanent magnets are arranged in the first and second cavities and magnetized in a manner that respective fluxes generated from the permanent magnets intensify each other in the interpole portions.

According to the above-mentioned invention, since the permanent magnets in the first cavities are magnetized in the directions substantially perpendicular to the pole-axes, they operate to repel the fluxes invading through the interpole portions of the rotor core. Additionally, since the relative permeability of the permanent magnet amounts to approx. 1, there is a tendency to increase the magnetic reluctance in the magnetic paths passing through the permanent magnets. Therefore, the magnetic fluxes of the armature windings do not flow through the substantial interpole portions but the core portions in the magnetic poles. As a result, owing to the formation of irregularities in the gap flux distribution, it is possible to produce a great reluctance torque for the rotating machine due to an increased change in magnetic energy.

In addition, since the fluxes of the permanent magnets in the second cavities are interlinked with the armature windings, an additional torque is also produced thereby to provide the machine with high torque accordingly.

While, since the magnetic fluxes of the magnets in the first cavities along the pole-axes are mainly distributed in the rotor core, the fluxes interlinking with the armature windings are almost occupied with the fluxes due to the permanent magnets in the second cavities. That is, since the permanent magnet-reluctance type rotating machine of the invention includes the permanent magnets arranged in the periphery of the rotor core (interpole portions), the surface area of the permanent magnets is reduced in comparison with that of the conventional permanent magnet type rotating machine having the permanent magnets attached on the outer surface of the rotor and similarly, the amount of interlinkage fluxes is also reduced. The permanent magnets are surrounded by the magnetic material, the amount of interlinkage flux is reduced because of magnetic short circuit, so that iron loss can be reduced. The terminal voltage is induced by combining the interlinkage fluxes due to the permanent magnets with the interlinkage fluxes due to the armature current (exciting current component of reluctance motor and torque current component). It means that to adjust the exciting current component allows the terminal voltage to be adjusted in a wide range. That is, it is possible to operate the rotating machine at variable speeds within a wide range in spite of power source of constant-voltage.

In the above-mentioned rotating machine, preferably, each of the interpole portions is provided with a plurality of the second cavities.

With the above-mentioned structure of the interpole portions, it is possible to use the permanent magnets in the second cavities, which are similar to the permanent magnets in the first cavities in dimensions. Thus, in manufacturing the machine, the number of kinds of parts can be minimized thereby to improve the productivity. It is also possible to control an amount of fluxes leaking to the outer peripheries of the interpole portions by modifying the arrangement of the magnets in the second cavities.

In the present invention, preferably, the rotor core further includes a plurality of third cavities which are oblong-shaped in the interpole portions respectively and which are positioned radially inside the first cavities so as to define a generally rectangular area surrounded by the first, second and third cavities in each of the interpole portions.

Alternatively, it is also preferable that the rotor core further includes a plurality of third cavities which are circular-shaped in the interpole portions respectively and which are positioned radially inside the first cavities so as to define a generally triangular area surrounded by the first, second and third cavities in each of the interpole portions.

In common with the above preferable forms, since the permanent magnets in the first cavities are magnetized in the directions substantially perpendicular to the pole-axes, they operate to repel the fluxes invading through the interpole portions of the rotor core. Additionally, since the relative permeability of the permanent magnet amounts to approx. 1, there is a tendency to increase the magnetic reluctance in the magnetic paths passing through the permanent magnets. Furthermore, owing to the provision of the third cavities, the magnetic reluctance in the magnetic paths along the interpole-axes is further increased. Therefore, the magnetic fluxes of the armature windings do not flow through the substantial interpole portions but the core portions in the magnetic poles. As a result, owing to the formation of irregularities in the gap flux distribution, it is possible to produce a great reluctance torque for the rotating machine due to an increased change in magnetic energy. In addition, since the fluxes of the permanent magnets in the second cavities are interlinked with the armature windings, an additional torque is also produced. Consequently, with the sum of these torque(s), the rotating machine of the invention is capable of generating high torque.

In common with the above preferable forms, preferably, each rotating machine further comprises additional permanent magnets which are accommodated in the third cavities respectively and which are magnetized in a manner that fluxes of the permanent magnets in the first, second and third cavities intensify each other in respective interpole core portions.

In this case, since the third cavities are filled up with the permanent magnets, the magnetic fluxes due to the permanent magnets can be further increased thereby causing the fluxes interlinking with the armature windings to be increased. Consequently, it is possible to increase torque of the machine in accordance with Fleming's left-hand rule.

In common with the above preferable forms, it is also preferable that each rotating machine further includes non-magnetic materials which are accommodated in the third cavities, respectively.

In this case, it is possible to enhance the strength of the rotor without spoiling the magnetic characteristics of the machine.

More preferably, the non-magnetic materials are conductive of electricity.

Also in this case, the eddy current generated in the materials allows to rotating machine to be self-activated. Further, it is possible to reduce the influence of harmonic magnetic field.

In the above-mentioned case of accommodating the permanent magnets in the third cavities, it is preferable that the permanent magnets in the first and third cavities are ferrite magnets, while the permanent magnets in the second cavities are the rare earth magnets.

In operation, since the ferrite magnets repel the armature fluxes flowing the interpole portions sufficiently while the rare earth magnets generate the torque by the interlinkaging with the armature windings, the machine is capable of generating the high torque effectively.

In the above-mentioned case of accommodating the permanent magnets in the third cavities, it is also preferable that the permanent magnets in the first and third cavities are bond magnets made of magnetic powder and resin, while the permanent magnets in the second cavities are the rare earth magnets.

Also in this case, with the same operation as mentioned above, the machine is capable of generating the high torque effectively. In addition, as the bond magnet is produced by solidifying magnetic powder by resin, the magnet has a great degree of freedom in configuration. Further, when the bond magnets are formed integrally with the rotor core by means of an injection molding etc., the manufacturing of the rotor will be facilitated.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core has a plurality of first cavities formed along respective pole-axes of the magnetic poles and a plurality of second cavities formed along outer peripheries of the interpole portions, the first and second cavities being oblong-shaped, and the permanent magnets are arranged only in the second cavities.

In the above-mentioned rotating machine, because of no magnets in the first cavities, the repel-action of the permanent magnets is lost, so that the fluxes of the armature windings passing through the interpole core portions are reduced only by the high magnetic reluctance of the second cavities. Although the torque of the machine is reduced, the rotor structure is simplified, so that the manufacturing of the machine can be facilitated.

In the above-mentioned rotating machine, preferably, the rotor core further includes a plurality of third cavities which are oblong-shaped in the interpole portions respectively and which are positioned radially inside the first cavities so as to define a generally rectangular area surrounded by the first, second and third cavities in each of the interpole portions.

Owing to the provision of the third cavities, the magnetic reluctance in the magnetic paths along the interpole-axes is further increased. Therefore, the magnetic fluxes of the armature windings do not flow through the substantial interpole portions but the core portions in the magnetic poles. As a result, owing to the formation of irregularities in the gap flux distribution, it is possible to produce a great reluctance torque for the rotating machine due to an increased change in magnetic energy. In addition, since the fluxes of the permanent magnets in the second cavities are interlinked with the armature windings, an additional torque is also produced. Consequently, with the sum of these torque(s), the rotating machine of the invention is capable of generating high torque.

Also in the above-mentioned rotating machine, more preferably, it further comprises non-magnetic materials which are accommodated in the first and third cavities, respectively.

As mentioned before, it is possible to enhance the strength of the rotor because of the resulting solid structure, without spoiling the magnetic property of the machine.

Also in this case, it is more preferable that the non-magnetic materials are conductive of electricity.

In this case, the resulting eddy current generating in the conductive materials makes the rotating machine to self-start to operate and allows the influence of harmonic magnetic field to be restrained.

The object of the present invention described above can be also accomplished by a reluctance type rotating machine comprising:

a stator having armature windings arranged on an inner periphery of the stator;

a rotor arranged radially inward the stator-through a gap, the rotor including a rotor core provided with magnetic poles and interpole portions between the magnetic poles; and a plurality of permanent arranged in the rotor so that magnetic fluxes of the permanent magnets repel flux of the armature windings leaking toward the interpole portions;

wherein the rotor core has a plurality of first cavities formed along respective pole-axes of the magnetic poles and a plurality of second cavities formed along outer peripheries of the interpole portions, the first and second cavities being oblong-shaped, and the permanent magnets are arranged only in the first cavities and magnetized in a manner that respective fluxes generated from the permanent magnets intensify each other in the interpole portions.

According to the embodiment, because of no magnets in the second cavities, the resulting torque resulting from the interlinkage of fluxes of the permanent magnets with the armature windings is almost lost, so that the reluctance torque will be the leader of torque. Although the torque of the machine is reduced similarly, the rotor structure is simplified by elimination of the magnets on the periphery, so that the manufacturing of the machine can be facilitated.

Also in this case, preferably, the rotor core further includes a plurality of third cavities which are oblong-shaped in the interpole portions respectively and which are positioned radially inside the first cavities so as to define a generally rectangular area surrounded by the first, second and third cavities in each of the interpole portions.

Owing to the provision of the third cavities, it is possible to produce a great reluctance torque for the rotating machine due to an increased change in magnetic energy.

Also in the above-mentioned rotating machine, more preferably, it further comprises non-magnetic materials which are accommodated in the second and third cavities, respectively.

As mentioned before, it is possible to enhance the strength of the rotor because of the resulting solid structure, without spoiling the magnetic property of the machine.

Also in this case, it is more preferable that the non-magnetic materials are conductive of electricity.

In this case, the resulting eddy current generating in the conductive materials makes the rotating machine to self-start to operate and allows the influence of harmonic magnetic field to be restrained.

The object of the present invention described above can be also accomplished by a reluctance type rotating machine comprising:

a stator having armature windings arranged on an inner periphery of the stator;

a rotor arranged radially inward the stator through a gap, the rotor including a rotor core provided with magnetic poles and interpole portions between the magnetic poles;

a plurality of permanent arranged in the rotor so that magnetic fluxes of the permanent magnets repel flux of the armature windings leaking toward the interpole portions; and magnetic end rings which are arranged on both axial ends of the rotor core, respectively.

Note, in the above-mentioned invention, a clearance may be defined between each axial end of the rotor core and each of the magnetic end rings.

With the above-mentioned arrangement, when the armature reaction fields in the opposite directions to the magnetization of the permanent magnets in the rotor core are applied to the rotor, a part of the magnetic fluxes of the permanent magnets forms closed magnetic paths each passing through a path along the rotational axis of the rotor from the magnet to the end ring, a path in the end ring and a path from the end ring to the magnet. That is, owing to the provision of the end rings, the fluxes can be effectively produced, thereby causing the interlinkage fluxes of the rotor with the armature windings to be adjusted. In this way, the terminal voltage can be easily adjusted by controlling the armature current.

These and other objects and features of the present invention will become more fully apparent from the following description and appended claims taken in conjunction with the accompany drawing.

DESCRIPTION OF THE PREFERRED EMBODIMENT

Figure 1:
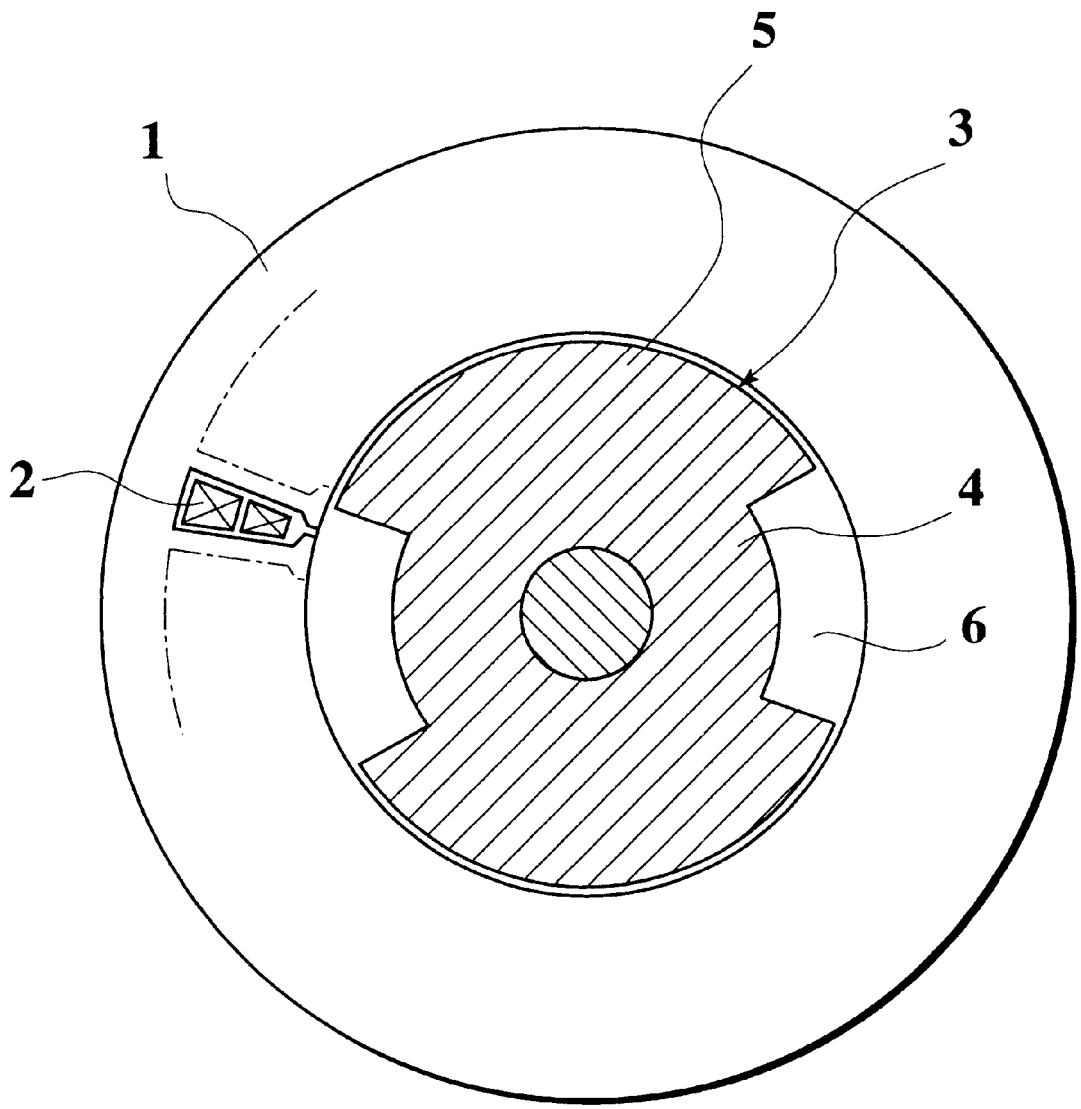
FIG. 1 is a cross sectional view of a rotor of a conventional reluctance type rotating machine, taken along the radial direction of the rotor.

A great number of embodiments of the present invention will be described with reference to the drawings. Note, common elements in some groups of the embodiments are indicated with the same reference numerals, respectively.

[1st. embodiment]

Figure 2:
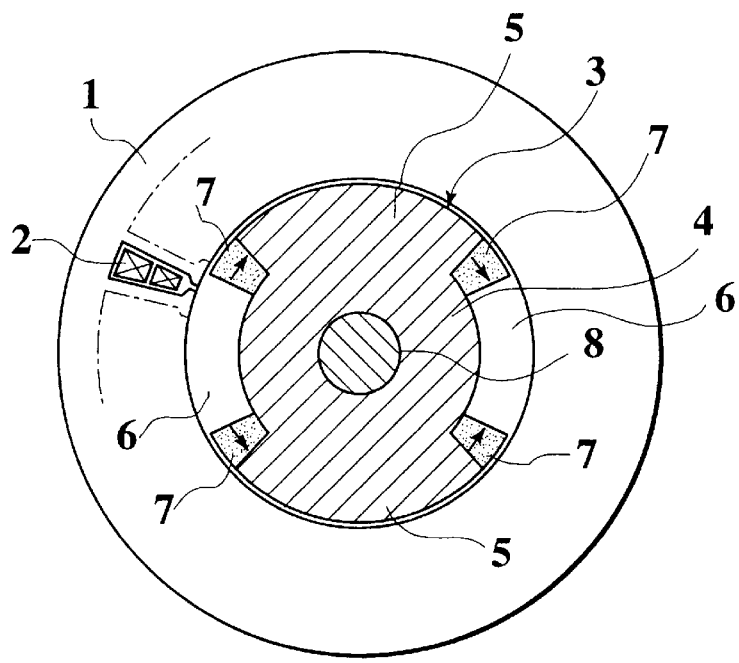
FIG. 2 is a cross sectional view of a reluctance type rotating machine in accordance with a first embodiment of the present invention, taken along the radial direction of the machine.
Figure 3:
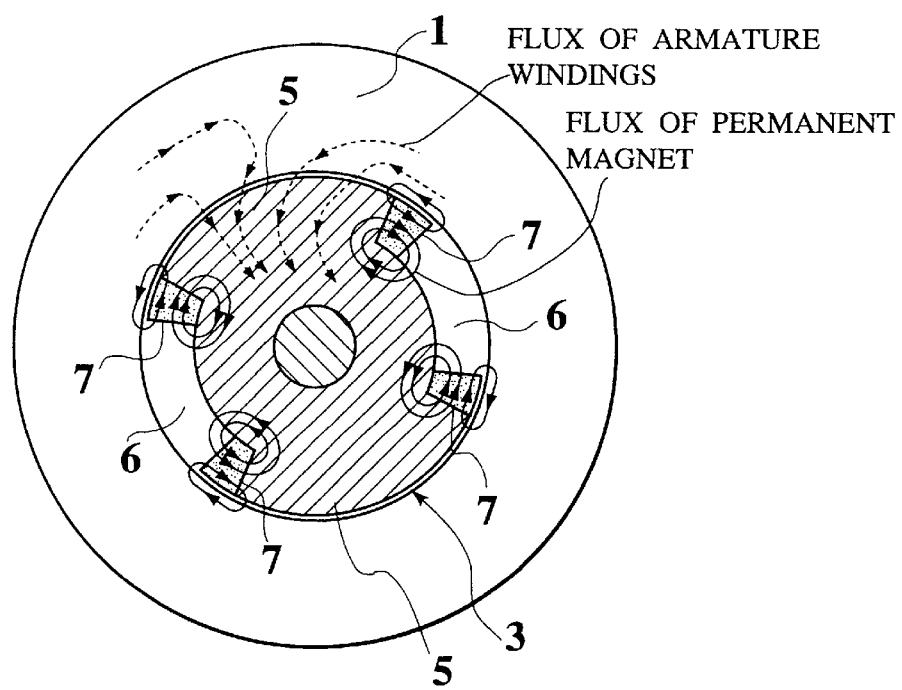
FIG. 3 is a cross sectional view of the reluctance type rotating machine of the first embodiment, showing a part of flows of magnetic fluxes of the machine.

FIG. 2 is a cross sectional view of a reluctance type rotating machine in accordance with the first embodiment of the present invention, taken along the radial direction of a rotor of the machine. A stator 1 includes armature windings 2. The rotor 3 is constituted by a rotor core 4. The rotor core 4 is provided with unevenness on a peripheral surface of the rotor 3 on the side of a gap between the stator 1 and the rotor 3. The rotor 3 is made of magnetic material, such as S45C (carbon steel for machines), laminated silicon steel plates or the like. On respective side faces of opposing projection portions 5 constituting magnetic poles of the rotor 3, the rotating machine of the embodiment includes Nd—Fe—B permanent magnets 7. FIG. 3 shows a distribution of magnetic fluxes of the above-mentioned rotating machine. Each permanent magnet 7 on the side face of the projection portion 5 is magnetized in the circumferential direction of the rotor 3 to form magnetic paths where magnetic fluxes (shown with solid lines) of the permanent magnet 7 flows through a rotor core portion in the vicinity of the permanent magnet 7 and the stator 1. Thus, the magnetic flux id lines) of the permanent magnets 7 serves to restrain the magnetic fluxes (dashed lines) of the armature windings of the stator 1 from leaking to the recess portions 6 between the opposing magnetic poles of the rotor 3 and the side faces of the projection portions 5 as the magnetic poles. In other words, by restraining the fluxes, it is possible to increase effective fluxes, whereby the high power output can be realized.

[2nd. embodiment]

Figure 4:
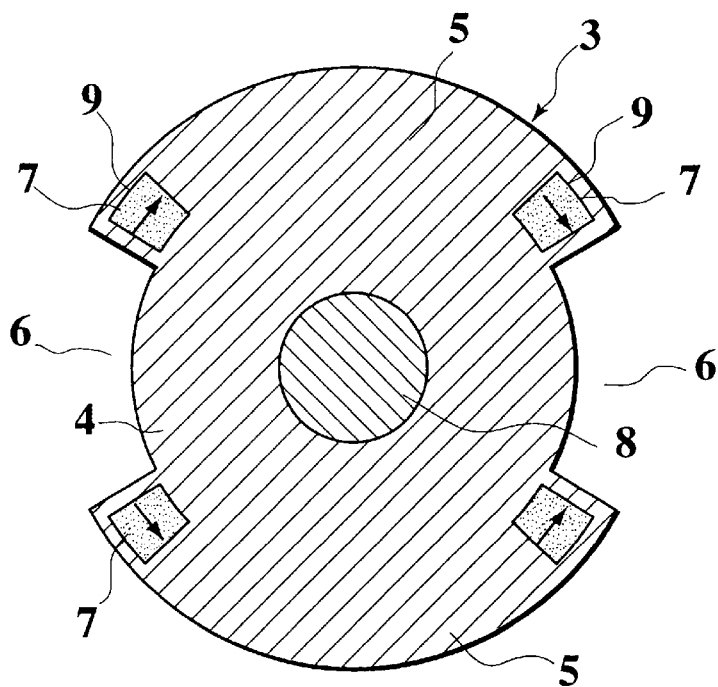
FIG. 4 is a cross sectional view of a rotor of a reluctance type rotating machine in accordance with a second embodiment of the present invention, taken along the radial direction of the machine.

FIG. 4 is a cross sectional view of a reluctance type rotating machine in accordance with the second embodiment of the present invention, taken along the radial direction of the rotor of the machine. Similarly to the first embodiment, the stator 1 includes the armature windings 2. The rotor 3 is constituted by the rotor core 4 provided with unevenness on the peripheral surface of the rotor 3 on the side of the gap between the stator 1 and the rotor 3. According to the embodiment, the rotor core 4 is provided, on respective sides of the projection portions 5, with rectangular cavities 9 in which the permanent magnets 7 are embedded, respectively. Similarly to the distribution of magnetic fluxes of FIG. 3, owing to the provision of the permanent magnets 7, it is possible to restrain the magnetic fluxes of the stator 1 from leaking to the recess portions 6 between the opposing magnetic poles of the rotor 3 and the side faces of the projection portions 5 as the magnetic poles. As the result, it is possible to increase effective fluxes, whereby the high power output can be realized. Additionally, since the permanent magnets 7 are embedded in the cavities 9, it is possible to strongly fix the permanent magnets 7 with the rotor core 4 during the machine's rotating at even high speed, high or low temperature where it is difficult to fix the permanent magnets 7 by adhesive agents.

Further, since the permanent magnets 7 are surrounded by the magnetic materials, magnetic short circuits are formed so that anti-magnetic field is reduced, and thus, it is possible to prevent the permanent magnets 7 from irreversibly being demagnetized. In other words, it is possible to raise an operative point on a demagnetizing curve of the permanent magnets 7 (increasing of permeance coefficient), so that the demagnetizing-proof characteristics against temperature and armature reaction can be improved. The recess portion reduces the magnetic fluxes from the armature windings 2 to the permanent magnets 7, so that the demagnetizing field to the permanent magnets 7 can be reduced.

Moreover, since the permanent magnets 7 are surrounded by the magnetic materials and recess portions 6 are formed in the interpole portions, it is possible to reduce interlinkage fluxes to the armature windings 2 of the stator 1 because of a magnetic short circuit to reduce iron loss, so that the efficiency at low load or no load operation range can be improved. Further, an induced voltage to the source power can be varied at wide range at load operation, so that a wide variable speed range of the motor can be obtained. By adjusting a radial thickness of the outside core portion, it is possible to control an amount of fluxes leaking to outer peripheral portions between the magnetic poles.

[3rd. and 4th. embodiments]

Figure 5:
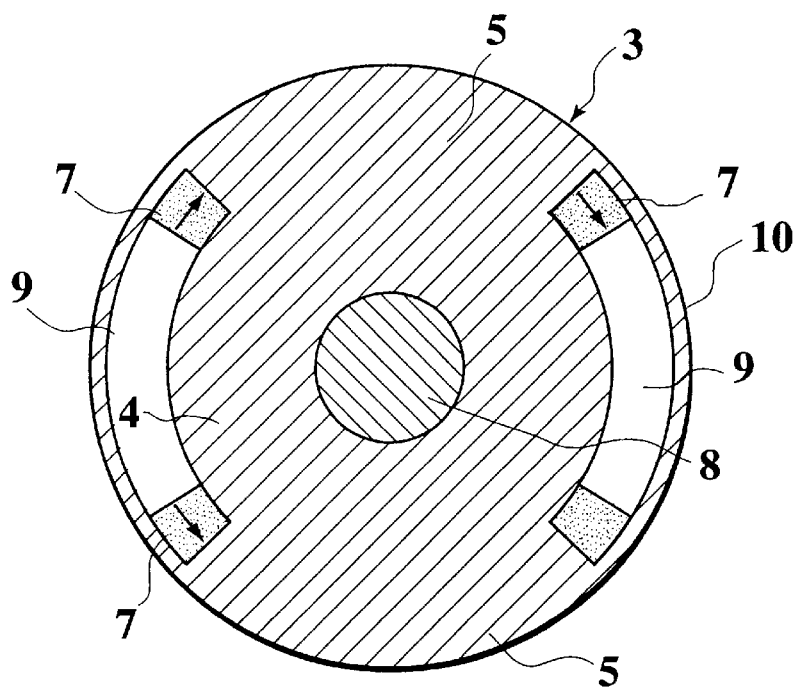
FIG. 5 is a cross sectional view of a rotor of a reluctance type rotating machine in accordance with a third embodiment of the present invention, taken along the radial direction of the machine.
Figure 6:
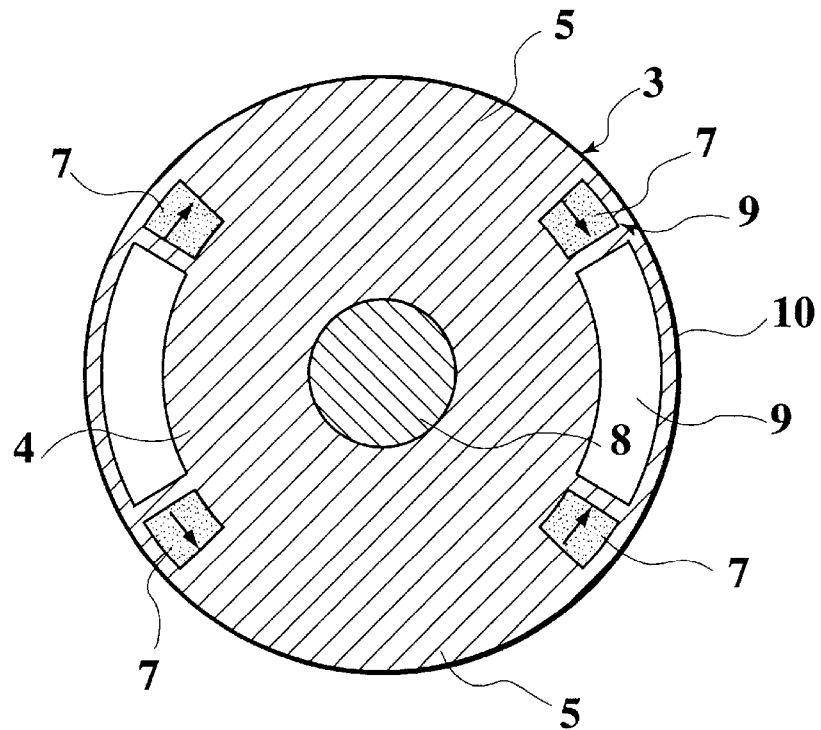
FIG. 6 is a cross sectional view of a rotor of a reluctance type rotating machine in accordance with a fourth embodiment of the present invention, taken along the radial direction of the machine.

FIG. 5 is a cross sectional view of a reluctance type rotating machine in accordance with the third embodiment of the present invention, taken along the radial direction of the rotor of the machine. FIG. 6 is a cross sectional view of a reluctance type rotating machine in accordance with the fourth embodiment of the present invention, taken along the radial direction of the rotor of the machine. Similarly to the first embodiment, in each embodiment, the stator includes the armature windings. The rotor 3 is constituted by the rotor core 4 provided with unevenness on the peripheral surface of the rotor 3 on the side of the gap. A difference between the above-mentioned embodiments and these embodiments resides in that the opposing projection portions 5 are connected with each other through long bridges 10. For example, the rotor 3 may be provided by punching circumferential elongated holes in laminated silicon plates. In the fourth embodiment of FIG. 6, the rectangular cavities 9 for accommodating the permanent magnets 7 therein are also formed at the same time of punching the circumferential elongated holes 6 in the rotor core 4. Owing to the provision of the permanent magnets 7 on the side faces of the projection portions 5, it is possible to restrain the magnetic fluxes of the stator 1 from leaking to the recess portions 6 between the opposing magnetic poles of the rotor 3 and the side faces of the projection portions 5 as the magnetic poles. As the result, it is possible to increase effective fluxes, whereby the high power output can be realized. Additionally, since the permanent magnets 7 are embedded in the cavities 9 surrounded by core portions, it is possible to strongly fix the permanent magnets 7 with the rotor core 4 during the machine's rotating at even high speed, high or low temperature where it is difficult to fix the permanent magnets 7 by adhesive agents.

Further, since the permanent magnets 7 are surrounded by the magnetic materials, it is possible to prevent the permanent magnets 7 from irreversibly being demagnetized. In other words, it is possible to raise an operative point on a demagnetizing curve of the permanent magnets 7 (increasing of permeance coefficient), so that the demagnetizing-proof characteristics against temperature and armature reaction can be improved. The bridges 10 (outer magnetic ring) serve to bypass the magnetic fluxes of armature reaction to reduce the demagnetizing field to the permanent magnets 7. The cavities 9 which do not accommodate permanent magnets 7 reduce the magnetic fluxes from the armature windings 2 to the permanent magnets 7, so that the demagnetizing field to the permanent magnets 7 can be reduced.

Moreover, since the permanent magnets 7 are surrounded by the magnetic materials and the cavities 9 are formed in the interpole portions, it is possible to reduce interlinkage fluxes to the armature windings 2 of the stator 1 because of a magnetic short circuit to reduce iron loss, so that the efficiency at low load or no load operation range can be improved. Further, an induced voltage to the source power can be varied at wide range at load operation, so that a wide variable speed range of the motor can be obtained.

[5th. and 6th. embodiments]

Figure 7:
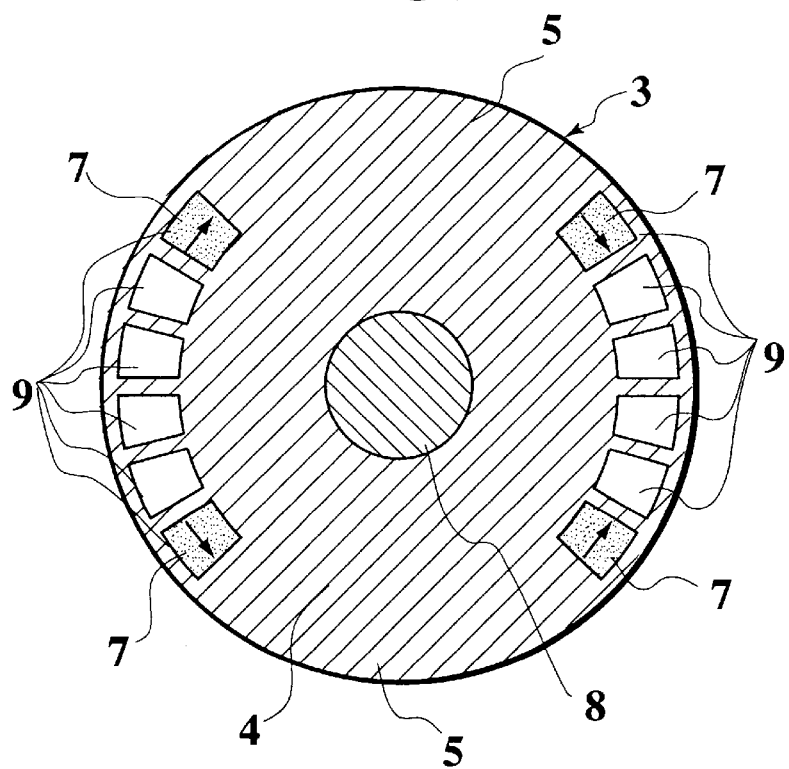
FIG. 7 is a cross sectional view of a rotor of a reluctance type rotating machine in accordance with a fifth embodiment of the present invention, taken along the radial direction of the machine.
Figure 8:
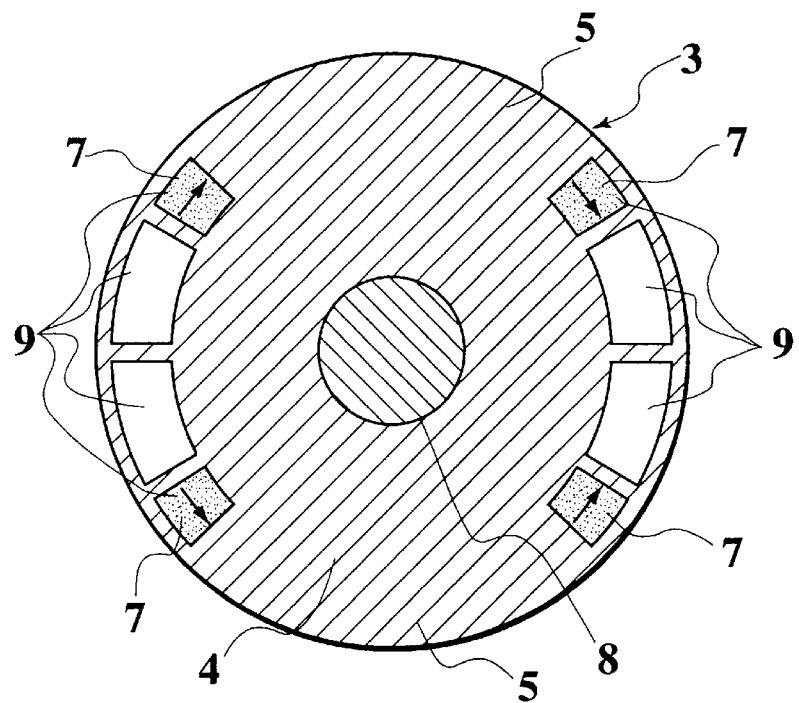
FIG. 8 is a cross sectional view of a rotor of a reluctance type rotating machine in accordance with a sixth embodiment of the present invention, taken along the radial direction of the machine.

FIG. 7 is a cross sectional view of a reluctance type rotating machine in accordance with the fifth embodiment of the present invention, taken along the radial direction of the rotor of the machine. FIG. 8 is a cross sectional view of a reluctance type rotating machine in accordance with the sixth embodiment of the present invention, taken along the radial direction of the rotor of the machine. Commonly, the stator of each rotating machine includes the armature windings. The rotor 3 is constituted by the cylindrical rotor core 4. In the rotor core 4, a plurality of rectangular cavities 9 are arranged between the adjoining magnetic poles (i.e. the projection portions 5) in the vicinity of the peripheral surface of the rotor 3 on the side of the gap. The permanent magnets 7 are disposed in the cavities 9 close to the side faces of the magnetic poles. In these embodiments, the rotor core 4 is composed of laminated silicon steel plates. The above-mentioned cavities 9 can be collectively provided by punching a plurality of rectangular holes in the laminated silicon steel plates in the circumferential direction. Note, the other cavities 9 without the permanent magnets 7 may be formed larger than the cavities 9 for accommodating the magnets 7.

According to the 5th. and 6th. embodiments, in common, it is possible to restrain the magnetic fluxes of the not-shown stator from leaking to the core portions between the opposing magnetic poles and also leaking to the side faces of the magnetic poles by the permanent magnets 7, whereby the high-power rotating machine can be realized with an increased effective fluxes. Simultaneously, since the permanent magnets 7 are embedded in the cavities 9 surrounded by the core portions, it is possible to strongly fix the permanent magnets 7 with the rotor core 4 during the machine's rotating at even high speed, high or low temperature where it is difficult to fix the permanent magnets 7 by adhesive agents. Furthermore, since the cavities 9 are not constituted by a few of large holes but a plurality of small holes, the strength of the rotor 3 can be improved.

Further, since the permanent magnets 7 are surrounded by the magnetic materials, it is possible to prevent the permanent magnets 7 from irreversibly being demagnetized. In other words, it is possible to raise an operative point on a demagnetizing curve of the permanent magnets 7 (increasing of permeance coefficient), so that the demagnetizing-proof characteristics against temperature and armature reaction can be improved. The bridges 10 (outer magnetic ring) serve to bypass the magnetic fluxes of armature reaction to reduce the demagnetizing field to the permanent magnets 7. The cavities 9 reduces the magnetic fluxes from the armature windings 2 to the permanent magnets 7, so that the demagnetizing field to the permanent magnets 7 can be reduced.

Moreover, since the permanent magnets 7 are surrounded by the magnetic materials and the cavities 9 are formed in the interpole portions, it is possible to reduce interlinkage fluxes to the armature windings 2 of the stator 1 because of a magnetic short circuit to reduce iron loss, so that the efficiency at low load or no load operation range can be improved. Further, an induced voltage to the source power can be varied at wide range at load operation, so that a wide variable speed range of the motor can be obtained.

[7th. and 8th. embodiments]

Figure 9:
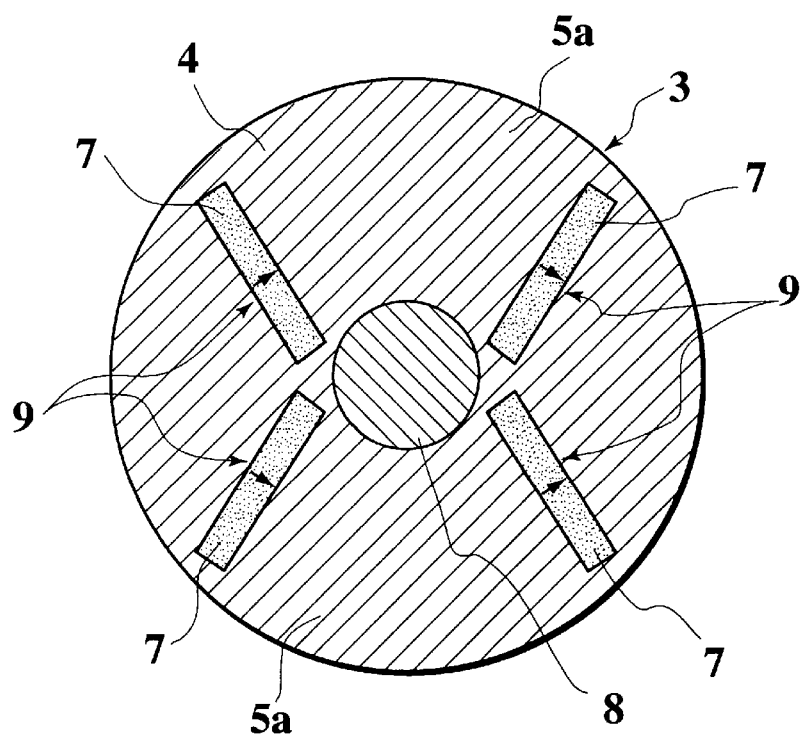
FIG. 9 is a cross sectional view of a rotor of a reluctance type rotating machine in accordance with a seventh embodiment of the present invention, taken along the radial direction of the machine.
Figure 10:
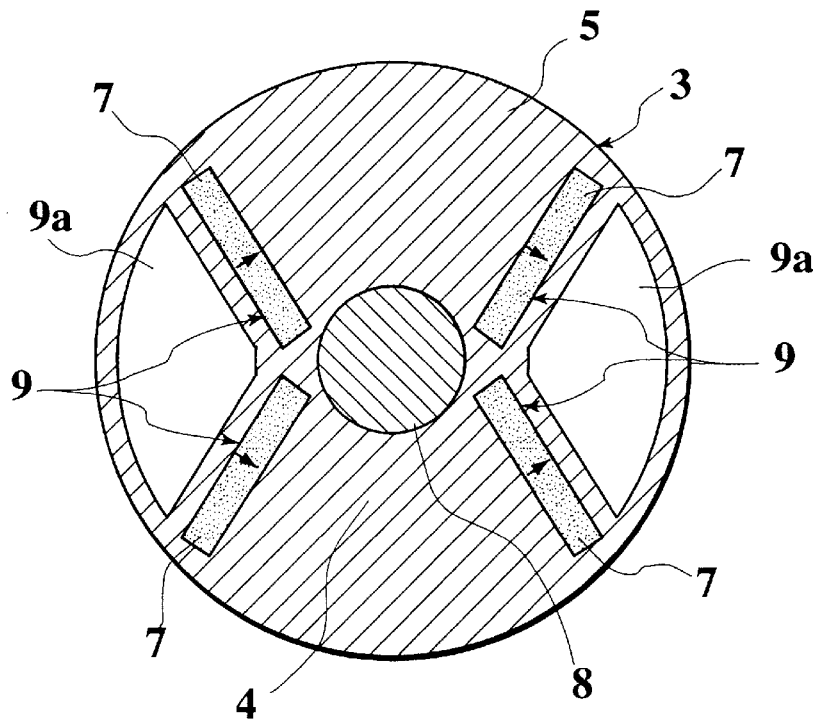
FIG. 10 is a cross sectional view of a rotor of a reluctance type rotating machine in accordance with an eighth embodiment of the present invention, taken along the radial direction of the machine.

FIG. 9 is a cross sectional view of a reluctance type rotating machine in accordance with the seventh embodiment of the present invention, taken along the radial direction of the rotor of the machine. FIG. 10 is a cross sectional view of a reluctance type rotating machine in accordance with the eighth embodiment of the present invention, taken along the radial direction of the rotor of the machine. Commonly, the stator of each rotating machine includes the armature windings. The rotor 3 is constituted by the cylindrical rotor core 4. The rotor core 4 is manufactured by laminating silicon steel plates. In the radial direction of the rotor core 4, elongated cavities 9 are formed along both side faces of core portions constituting opposing magnetic poles 5a, thereby providing V-shaped cavities between the opposing magnetic poles 5a, 5a. The permanent magnets 7 are disposed in the cavities 9. Similarly to the aforementioned embodiments, these cavities 9 are collectively provided by piercing the laminated silicon steel plates.

Since the permanent magnets 7 between the magnetic poles 5a, 5a are magnetized in the generally circumferential direction of the rotor 3, it is possible to restrain the magnetic fluxes of from leaking to the core portions between the opposing magnetic poles 5a, 5a and also leaking to the side faces of the magnetic poles 5a, 5a, whereby the high-power rotating machine can be realized with increased effective fluxes. Simultaneously, since the permanent magnets 7 are embedded in the cavities 9 surrounded by the core portions, it is possible to strongly fix the permanent magnets 7 with the rotor core 4 during the machine's rotating at even high speed, high or low temperature where it is difficult to fix the permanent magnets 7 by adhesive agents.

Further, since the permanent magnets 7 are surrounded by the magnetic materials, it is possible to prevent the permanent magnets 7 from irreversibly being demagnetized. In other words, it is possible to raise an operative point on a demagnetizing curve of the permanent magnets 7 (increasing of permeance coefficient), so that the demagnetizing-proof characteristics against temperature and armature reaction can be improved.

Moreover, since the permanent magnets 7 are surrounded by the magnetic materials, it is possible to reduce interlinkage fluxes to the armature windings 2 of the stator 1 because of a magnetic short circuit to reduce iron loss, so that the efficiency at low load or no load operation range can be improved. Further, an induced voltage to the source power can be varied at wide range at load operation, so that a wide variable speed range of the motor can be obtained.

Furthermore, according to the eighth embodiment of FIG. 10, since two fan-shaped cavities 9a are also formed at respective intermediate parts of the core portions between the magnetic poles 5a, 5a, magnetic reluctance is so enhanced as to decrease the fluxes between the magnetic poles as a whole. The cavities 9a reduces the magnetic fluxes from the armature windings 2 to the permanent magnets 7, so that the demagnetizing field to the permanent magnets 7 can be reduced.

[9th. embodiment]

Figure 11:
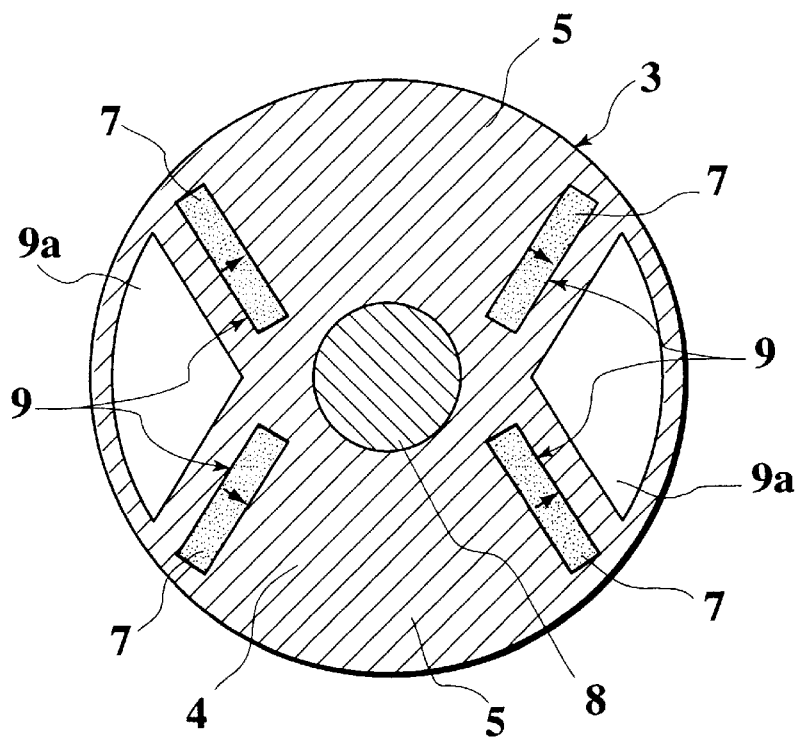
FIG. 11 is a cross sectional view of a rotor of a reluctance type rotating machine in accordance with a ninth embodiment of the present invention, taken along the radial direction of the machine.

FIG. 11 is a cross sectional view of a reluctance type rotating machine in accordance with the ninth embodiment of the present invention, taken along the radial direction of the rotor of the machine. Also in this embodiment, the stator (not shown) includes the armature windings, while the rotor 3 is constituted by the cylindrical rotor core 4 and the permanent magnets 7 arranged in V-shaped manner. According to the embodiment, each permanent magnet 7 is formed shorter than the radius of the rotor 3 in a manner that core portions are formed on both sides of the magnet 7. Consequently, the magnetic fluxes of each permanent magnet 7 flow through the peripheral and center portions of the core 4 on both sides of the magnet 7 in respective short circuits, so that the magnetic fluxes of each magnet can form substantially closed magnetic paths in the rotor core 4. Owing to the formation of shirt circuits, it is possible to reduce outside magnetic reluctance in aspects of the permanent magnets 7 and also reduce opposite magnetic field applied on the permanent magnets 7 while standing against demagnetization.

[10th. embodiment]

Figure 12:
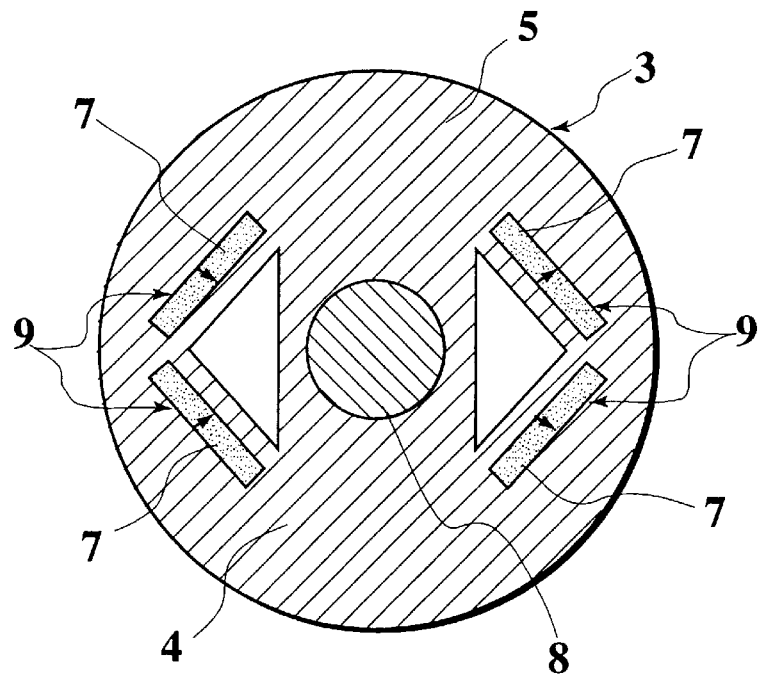
FIG. 12 is a cross sectional view of a rotor of a reluctance type rotating machine in accordance with a tenth embodiment of the present invention, taken along the radial direction of the machine.

FIG. 12 is a cross sectional view of a reluctance type rotating machine in accordance with the tenth embodiment of the present invention, taken along the radial direction of the rotor of the machine. The reluctance type rotating machine of the embodiment has similar structure and effect to those of the seventh and eighth embodiments. In this embodiment, however, since the permanent magnets 7 in the rotor core 4 are arranged in a reverse V-shaped manner, the magnetic fluxes from the permanent magnets 7 can form closed circuits in the rotor core 4. That is, it is possible to reduce outside magnetic reluctance in aspects of the permanent magnets 7 and also reduce opposite magnetic field applied on the permanent magnets 7 while standing against demagnetization.

[11th. embodiment]

We now describe the eleventh embodiment of the present invention with reference to no drawings. The reluctance type rotating machine of the embodiment is similar to that of the above-mentioned embodiment, in view of its structure and effect. In this embodiment, however, since the rotor core is composed of laminated electromagnetic steel plates, it is possible to reduce an eddy current generated in the rotor core.

[12th. embodiment]

Also in the twelfth embodiment of the present invention, the reluctance type rotating machine is similar to that of the above-mentioned embodiment, in view of its structure and effect. In this embodiment, however, since members of non-magnetic stainless steel (e.g. SUS304) are accommodated in cavities with no permanent magnet, it is possible to enhance the strength of the rotor itself.

[13th. embodiment]

Also in the thirteenth embodiment of the present invention, the reluctance type rotating machine is similar to that of the above-mentioned embodiment, in view of its structure and effect. However, according to the embodiment, members made of copper (Cu) or aluminum (Al) as conductive non-magnetic material are accommodated in cavities with no permanent magnet. Therefore, if the rotating machine transitionally operates at asynchronous speed, an eddy current flows through the above conductive members, so that the rotor can rotate under a stable condition. Further, since a current flows in the conductive members so that high-frequency current in the armature windings is restrained, it is possible to reduce the influence of high-frequency.

[14th. embodiment]

Figure 13:
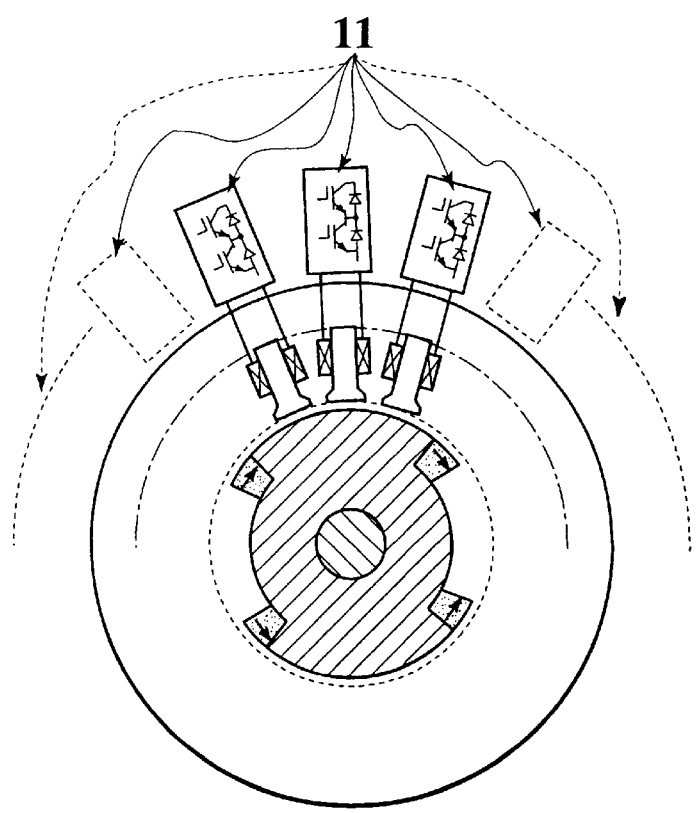
FIG. 13 is a cross sectional view of a rotor of a reluctance type rotating machine in accordance with a fourteenth embodiment of the present invention, taken along the radial direction of the machine.

FIG. 13 is a cross sectional view of a reluctance type rotating machine in accordance with the fourteenth embodiment of the present invention, taken along the radial direction of the rotor of the machine. The reluctance type rotating machine of the embodiment has similar structure and effect to the above-mentioned embodiment. In this embodiment, however, since the rotating machine includes plural pairs of units 11 each consisting of armature windings and a power element (e.g. thyristor, power transistor etc., as semiconductor devices for electrical power) connected to each other, it is possible to replace a power element of large capacity with a great number of normal power elements of small capacities.

[15th. embodiment]

Figure 14:
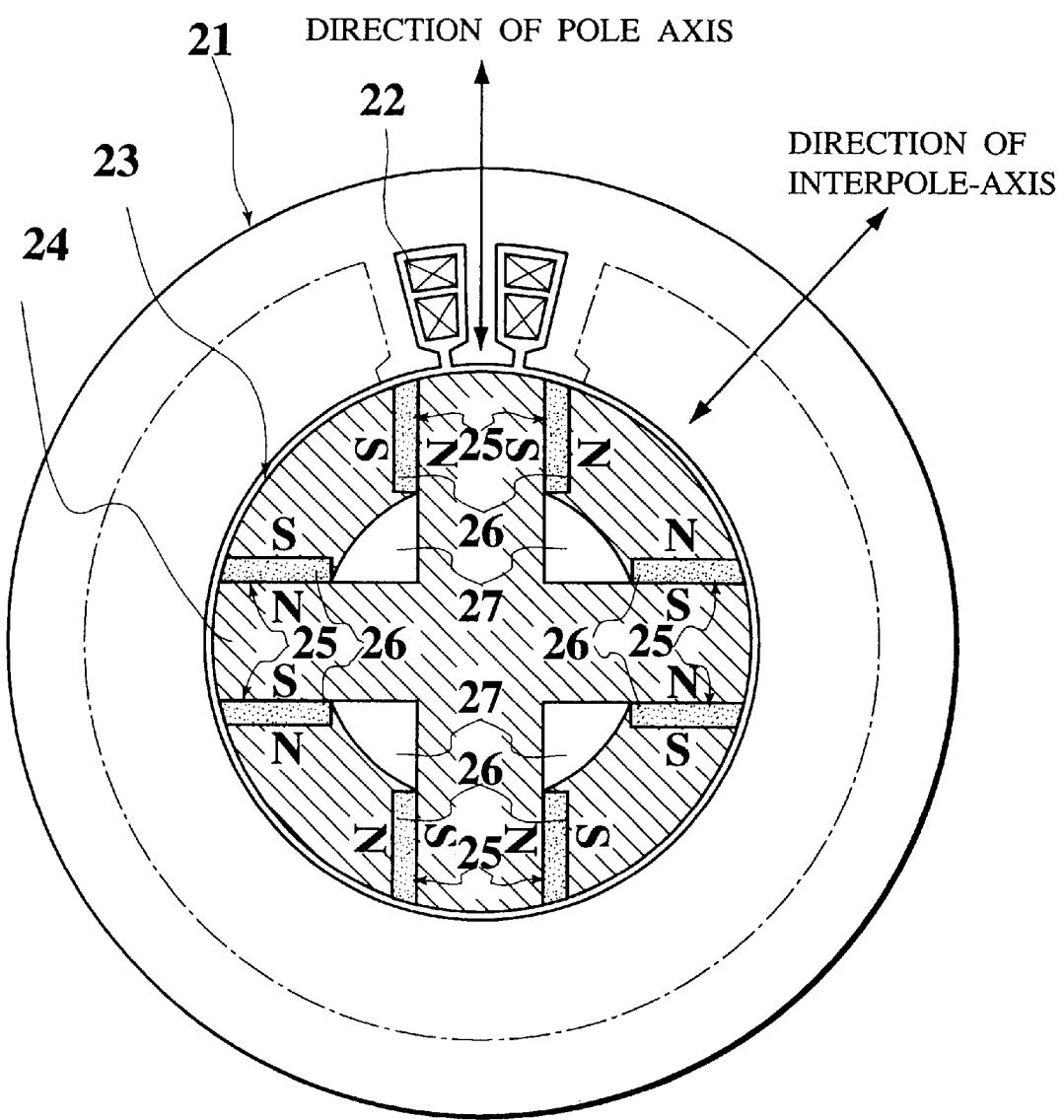
FIG. 14 is a cross sectional view of a rotor of a reluctance type rotating machine in accordance with a fifteenth embodiment of the present invention, taken along the radial direction of the machine.

FIG. 14 is a cross sectional view of a reluctance type rotating machine in accordance with the fifteenth embodiment of the present invention, taken along the radial direction of a rotor of the machine. The rotating machine of the embodiment comprises a stator 21 having tetra-polar type armature windings 22 and a rotor 23 constituted by a cylindrical rotor core 24.

The rotor core 24 is constituted by-either one of a cylindrical member made of soft carbon steel S45C and stacks of circular silicon steel plates. Arranged along each pole-axis of the rotor core 24 are a pair of oblong cavities 25 which are apart from each other at a pole-width. As the tetra-polar type armature windings 22 of the embodiment has four magnetic poles arranged in a cross-shaped manner, these cavities 25 are formed so as to interpose each magnetic pole therebetween.

Permanent magnets 26 in Nd—Fe—B alloy families are inserted into the cavities 25 and fixed therein by means of adhesive agents. Each permanent magnet 26 is magnetized in a direction perpendicular to the pole-axis. As to the magnetizing direction, the permanent magnets 26 along the magnetic poles are magnetized in a manner that respective fluxes from the magnets 26 intensify each other in the respective core portions among the magnetic poles, namely, the respective interpole portions.

In other words, firstly, the permanent magnets 26 on both sides of each magnetic pole are magnetized in the same direction and magnetized perpendicular to the magnetic pole between the same magnets 26.

Secondly, as to the neighboring magnets 26 over the different magnetic poles, two permanent magnets 26 on both sides of one interpole portion are magnetized in the opposite directions and also magnetized in a manner that, in the interpole portion, the respective fluxes from the neighboring magnets 26 intensify each other in the radial direction.

Further, four fan-shaped cavities 27 are formed so as to terminate with both of the cavities 25 arranged along the magnetic poles and a center portion of the rotor core 24.

[16th. embodiment]

Figure 15:
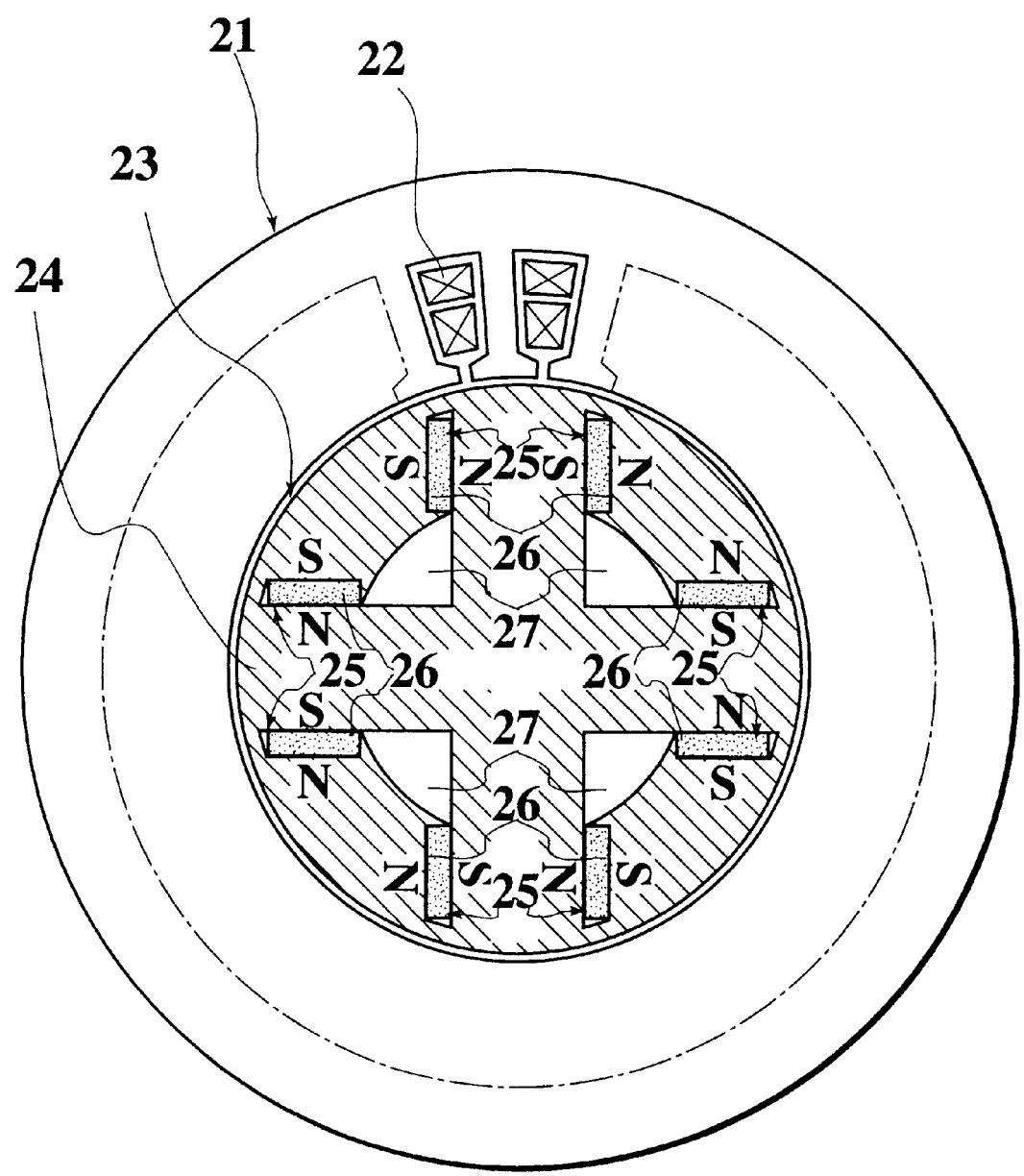
FIG. 15 is a cross sectional view of a rotor of a reluctance type rotating machine in accordance with a sixteenth embodiment of the present invention, taken along the radial direction of the machine.

FIG. 15 is a cross sectional view of a reluctance type rotating machine in accordance with the sixteenth embodiment of the present invention, taken along the radial direction of a rotor of the machine. Different from the fifteenth embodiment, the rotating machine of the embodiment is provided with the cavities 25 each of which has an radially outer end positioned inside the outer periphery of the rotor core 24 and in which the permanent magnets 6 are accommodated. Therefore, owing to such a formation, there remains a part of the rotor core 24 between the outer end of each magnet 26 and the outer periphery of the rotor 23. Note, also in this embodiment, the rotor 23 is provided with the four fan-shaped cavities 27.

[17th. embodiment]

Figure 16:
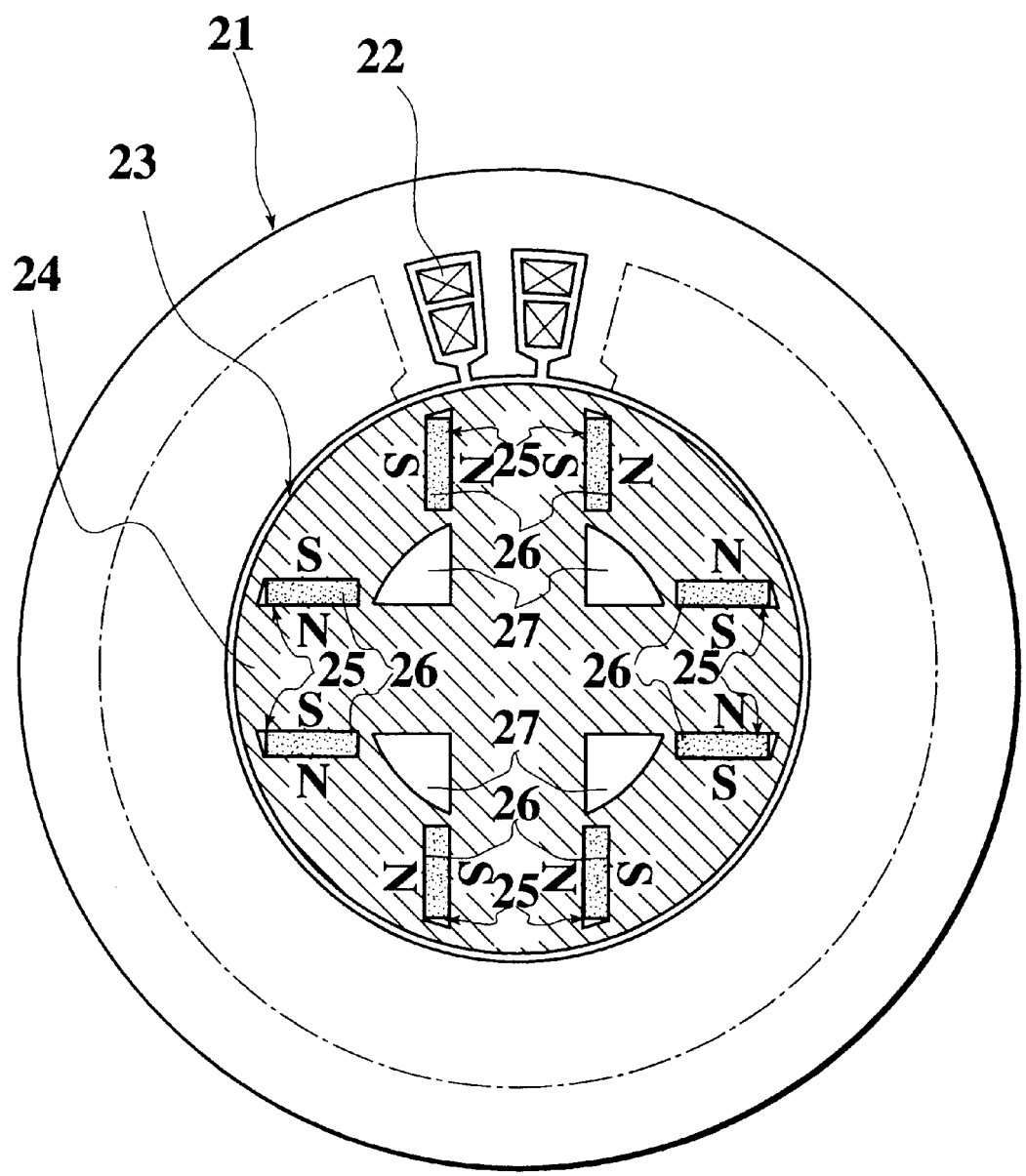
FIG. 16 is a cross sectional view of a rotor of a reluctance type rotating machine in accordance with a seventeenth embodiment of the present invention, taken along the radial direction of the machine.

FIG. 16 is a cross sectional view of a reluctance type rotating machine in accordance with the seventeenth embodiment of the present invention, taken along the radial direction of a rotor of the machine. Although the rotating machine of the embodiment has the cavities 25 and the permanent magnets 26 both similar to those of the sixteenth embodiment, each of the four fan-shaped cavities 27 is formed so as to define a part of the rotor core 24 between the inside end of each cavity 25 and the radially outer end of the cavity 27.

Figure 17:
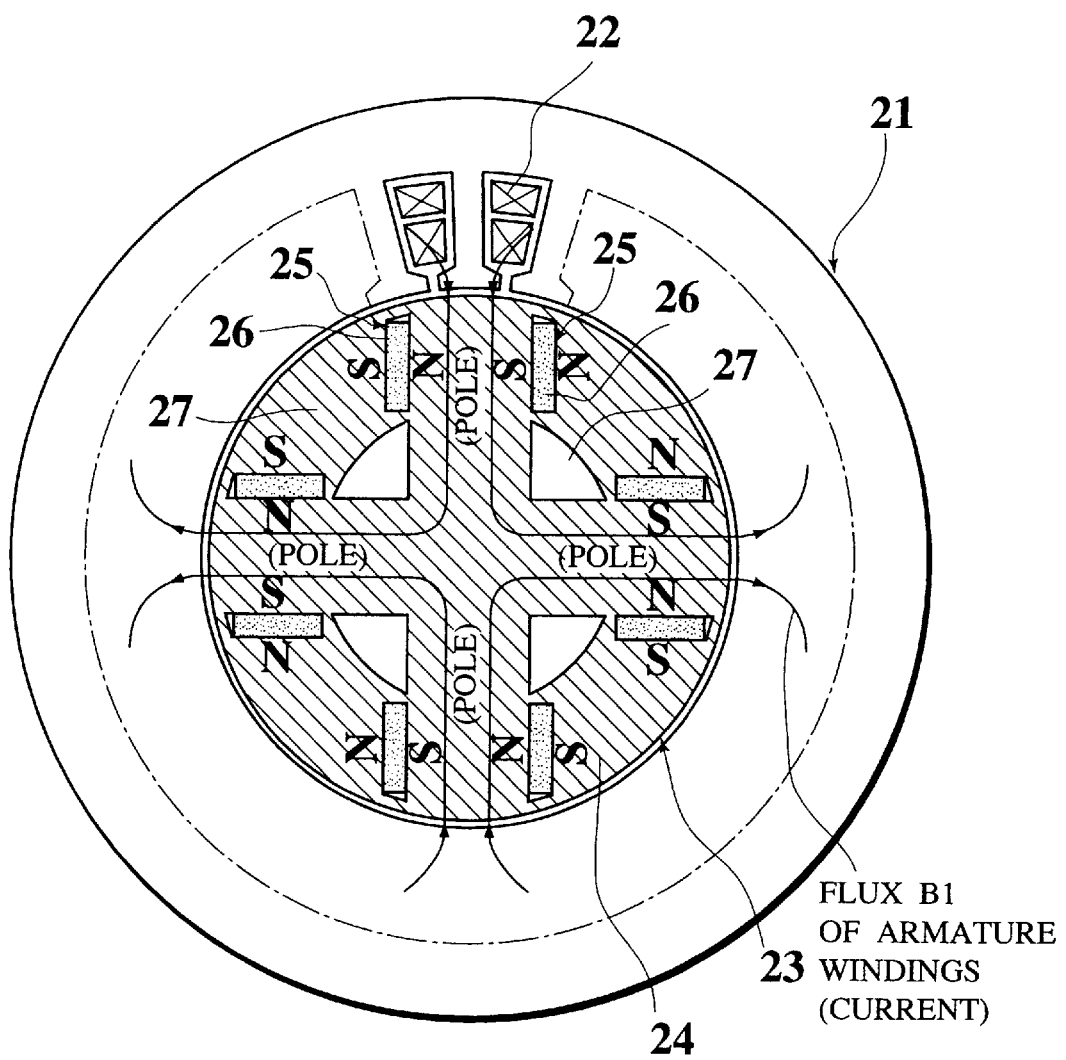
FIG. 17 is a cross sectional view of the rotor of the reluctance type rotating machine of the seventeenth embodiment, showing respective flows of fluxes of armature windings in the directions of pole-axes.
Figure 18:
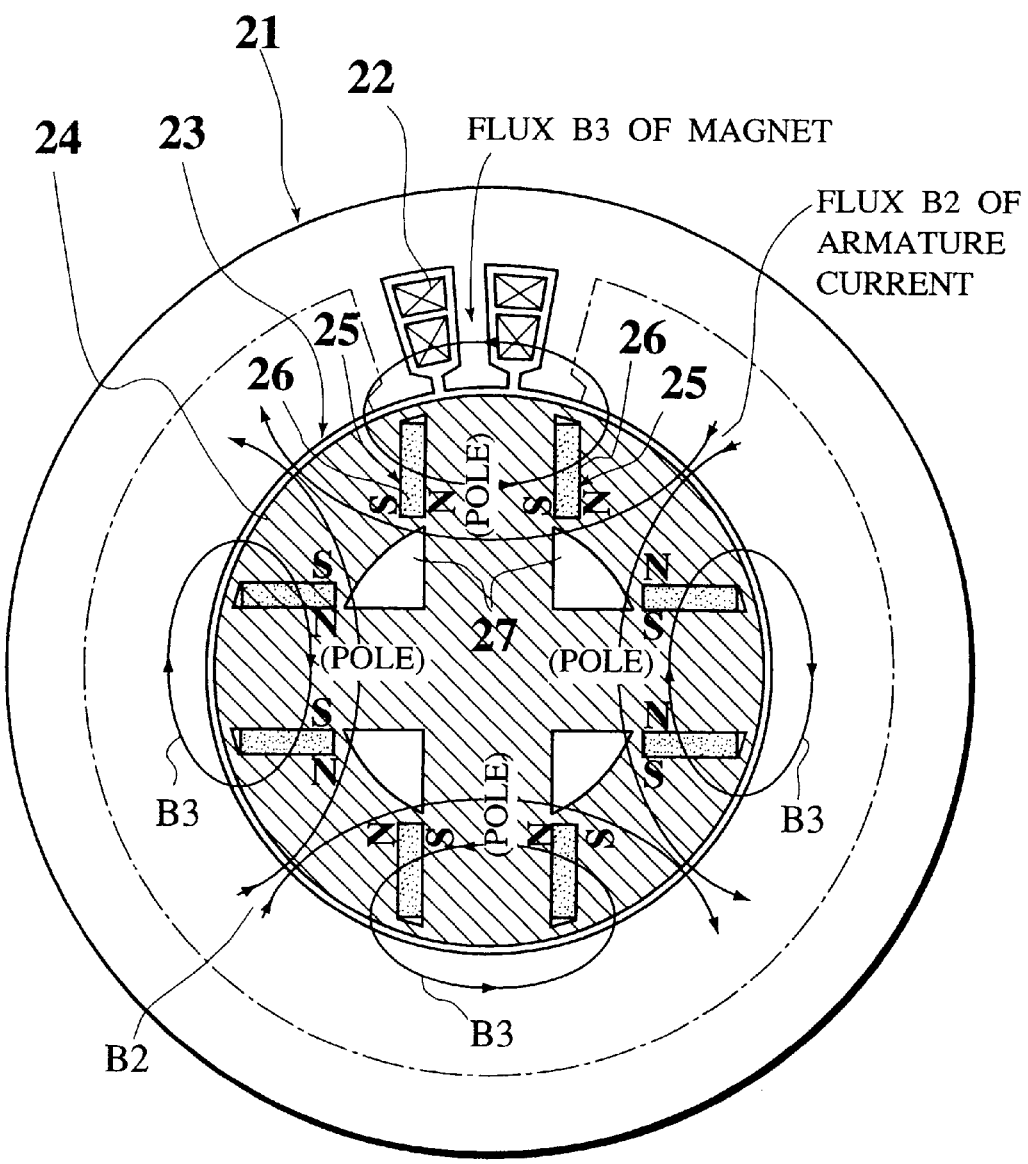
FIG. 18 is a cross sectional view of the rotor of the reluctance type rotating machine of the seventeenth embodiment, showing respective flows of fluxes of armature windings in the directions of interpole-axes.

We now describe operations of the rotating machines in accordance with the 15th. to 17th. embodiments with reference to FIGS. 17 and 18.

[Re. principles to produce high-torque]

FIG. 17 shows magnetic fluxes B1 produced by the armature current, in the directions along the pole-axes. Since the magnetic fluxes B1 have magnetic paths of the rotor core 24 at the magnetic poles, the magnetic reluctance in this direction is remarkably small, providing a magnetic structure facilitating the fluxes' flowing.

FIG. 18 shows magnetic fluxes B2 produced by the armature current, in the directions along not-shown interpole-axes passing through diametrical core portions between the respective magnetic poles. Although the magnetic fluxes B2 between the magnetic poles form magnetic paths crossing the opposing permanent magnets 26 and the cavities 27, the magnetic fluxes by the armature current can be reduced by the action of high magnetic reluctance of the permanent magnets 26 and the cavities 27 since the relative permeability of the permanent magnet 26 amounts to approx. 1.

Furthermore, since the permanent magnets 26 in the cavities 25 are magnetized in the direction substantially perpendicular to the pole-axes, the magnetic fluxes B3 of the magnets 26 travel across the magnetic poles of the rotor 23, from the core portion positioned between the magnetic poles to the stator 21 through the gap, and returns to the magnets 26 through another core portion positioned between the magnetic poles. Distributing in the opposite direction to the magnetic fluxes B2 by the armature current, the magnetic fluxes B3 of the permanent magnets 26 repel the armature fluxes invading between the magnetic poles. Alternatively, at the gap portion between the magnetic poles, the magnetic fluxes caused by the armature current are reduced by the fluxes B3 of the permanent magnets 26, in comparison with the magnetic fluxes of the gap portion over the magnetic poles. In other words, the magnetic fluxes at the gap portion greatly change with respect to the rotational position of the rotor 23, so that the changes of magnetic energy is increased. Thus, it can be considered that, owing to the provision of the permanent magnets, equivalent magnetic fluxes are changed to provide the machine with high power output. As a result, since the flux distribution with respect to the gap exhibits irregularities, it is possible to generate a great power output due to the changes of magnetic energy.

The above-mentioned action will be specifically recognized by a difference between a flux distribution at the gap brought by employing ferrite magnets of low magnetic energy product as the permanent magnets and another flux distribution at the gap brought by employing Nd—Fe—B magnets of high magnetic energy product.

We now describe the fact on the basis of experimental data.

The gap flux densities of the fluxes B1 in the direction of magnetic axis are 0.7–0.8 [T] in either case of using ferrite magnet and Nd—Fe—B magnet. On the other hand, the gap flux densities of the fluxes B2 in the direction of axis between magnetic poles represent 0.1 [T] in ferrite magnet and −0.3 [T] in Nd—Fe—B magnet (negative polarity), respectively. Consequently, it can be understood that Nd—Fe—B magnet forms a magnetic field opposite to a magnetic field of the armature current thereby to remarkably increase the change in flux distribution about the gap with respect to the rotational position of the rotor.

[Re. the range of adjusting terminal voltage, enabling machine to operate with a wide range of adjustable speeds]

In common with the above-mentioned embodiments of FIGS. 14–16, since the permanent magnet-reluctance type rotating machine includes the permanent magnets 26 accommodated in the only cavities 25 along the pole-axes, the surface area of the permanent magnets is reduced in comparison with that of the conventional permanent magnet type rotating machine having the permanent magnets attached on the outer surface of the rotor and similarly, the amount of interlinkage flux is also reduced. In FIGS. 15 and 16, the permanent magnets 26 are surrounded by the magnetic material, the amount of interlinkage flux is reduced because of magnetic short circuit, so that iron loss can be reduced. The terminal voltage is induced by combining the interlinkage flux due to the permanent magnets 26 with the interlinkage flux due to the armature current (exciting current component of reluctance motor and torque current component). This means that to adjust the exciting current component allows the terminal voltage to be adjusted in a wide range. That is, it is possible to operate the rotating machine at variable speeds within a wide range in spite of power source of constant-voltage.

In the sixteenth embodiment of FIG. 15, since the permanent magnets 26 are embedded in the rotor core 24, the mechanical strength of the rotor can be enhanced in comparison with that of the embodiment of FIG. 14.

In the seventeenth embodiment of FIG. 16, since respective portions of the rotor core 24 are defined outside and inside the permanent magnets 26, a part of the magnetic fluxes B3 of the permanent magnets 26 leaks out through the portions of the rotor core 24 thereby to minimize demagnetic field in the permanent magnets 26. In other words, it is possible to raise an operative point on a demagnetizing curve of the permanent magnet 26 (increasing of permeance coefficient), so that the demagnetizing-proof characteristics against temperature and armature reaction can be improved.

[18th. embodiment]

Figure 19:
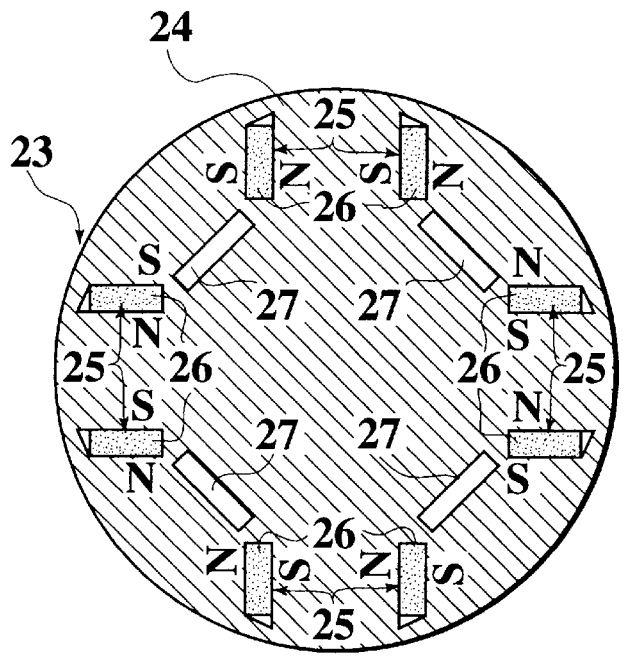
FIG. 19 is a cross sectional view of a rotor of a reluctance type rotating machine in accordance with an eighteenth embodiment of the present invention, taken along the radial direction of the machine.

FIG. 19 is a cross sectional view of a reluctance type rotating machine in accordance with the eighteenth embodiment of the present invention, taken along the radial direction of a rotor of the machine. Different from the above-mentioned 15th. to 17th. embodiments, the inner cavities 27 between the magnetic poles are shaped to be oblong.

It should be noted that in the multi-polar machine, since the cavities 25 along the pole-axes are generally arranged in a polygonal manner in the rotor core 24, the remaining space in the rotor 23 is available effectively. From this point of view, the formation of the oblong cavities 27 allows a radial thickness of the rotor 23 to be increased, so that it is possible to enhance the magnetic reluctance in the radial direction of the rotor core 24 having a limited cross section, effectively.

Figure 20:
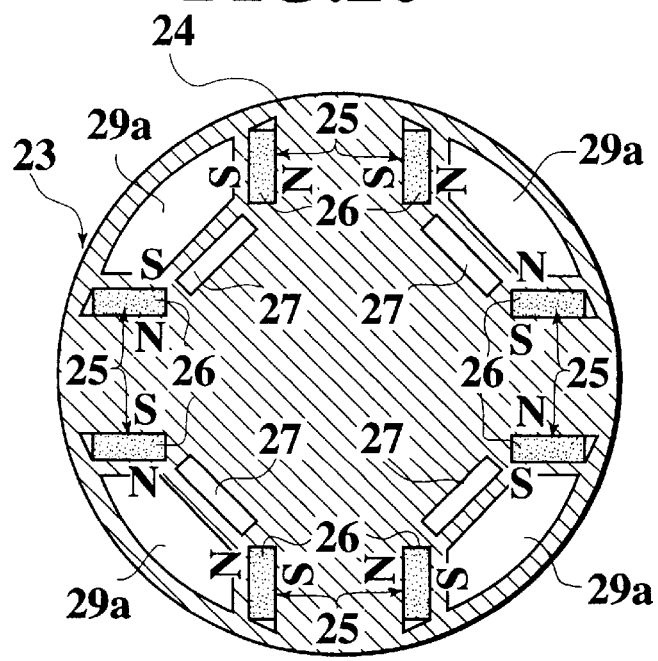
FIG. 20 is a cross sectional view of a modification of a rotor of a reluctance type rotating machine in accordance with an eighteenth embodiment of the present invention, taken along the radial direction of the machine.

FIG. 20 shows a modification of the reluctance type rotating machine of the eighteenth embodiment of the present invention. This reluctance type rotating machine has relatively large cavities 29a in the interpole portions. These cavities 29a serve as magnetic reluctance in the interpole portion to the permanent magnets 26 arranged along the magnetic pole. Consequently, the magnetic fluxes from the permanent magnets 26 through the cavities 29a to the armature windings 22 are considerably reduced. Considerable amount of the magnetic fluxes from the permanent magnets 26 pass through rotor core 24 surrounding the permanent magnets 26, namely, through a portion between the permanent magnets 26 and the outer surface of the rotor core 24 and a radially inward portion from the permanent magnets 26. Almost magnetic fluxes from the permanent magnets 26 are confined in the rotor core 24. Thus, it is possible to considerably reduce the induced voltage by the permanent magnets 26. Consequently, the rate of voltage of the permanent magnets 26 to the power supply voltage decreases, so that variable voltage range becomes wide. Namely, variable speed range becomes wide. In addition, because of a little magnetic fluxes of the permanent magnets 26, iron loss can be effectively reduced at low load or unload operation.

[19th. embodiment]

Figure 21:
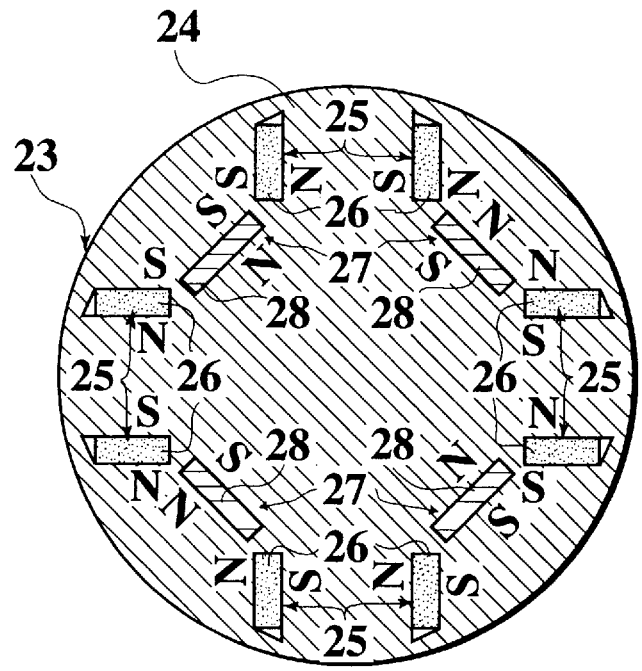
FIG. 21 is a cross sectional view of a rotor of a reluctance type rotating machine in accordance with a nineteenth embodiment of the present invention, taken along the radial direction of the machine.

FIG. 21 is a cross sectional view of a reluctance type rotating machine in accordance with the nineteenth embodiment of the present invention, taken along the radial direction of a rotor of the machine. A difference between the eighteenth embodiment and the nineteenth embodiment resides in that the permanent magnets 28 are accommodated in the above oblong cavities 27 in this embodiment. In the radial direction of the rotor 23, each of the permanent magnets 28 is so magnetized as to be opposite to the magnetic field component due to the armature current in the direction of each interpole-axis.

According to the embodiment, owing to the above magnetization of the permanent magnets 28 in the cavities 27, it is possible to reduce the gap flux (magnetic flux at gap) in the directions of the interpole-axes. Further, when the rare earth permanent magnets of high magnetic energy product are employed for the magnets 28, the gap field in the direction of the interpole-axis can be faced in the opposite direction to the magnetic fields due to the armature current, so that it is possible to increase the change in the distribution of gap flux density with respect to the rotational position of the rotor 23. Consequently, with the increased change of the distribution of gap flux density, namely, the increased change of magnetic energy, the power output of the machine can be improved. Alternatively, it may be considered that since the permanent magnets 28 repel the magnetic fluxes due to the armature current entering from the interpole-axis, the irregularities of distribution in gap flux density is enlarged to increase the power output of the machine.

Note, in the modification, the permanent magnets 28 may be arranged in the fan-shaped cavities 27 in the embodiments of FIGS. 14 to 16 in order to realize the above-mentioned effects.

Further, the rare earth permanent magnets of high magnetic energy product, such as Nd—Fe—B magnets, may be employed as the permanent magnets 26 in the cavities 25 along each magnetic pole of the rotor core 24 while using the permanent magnets of low magnetic energy product, such as ferrite magnets, as the permanent magnets 28 in the cavities 26 between the magnetic poles. In this case, the closer it approaches the outer periphery of the rotor 23, the more demagnetizing field due to the armature reaction is distributed intensely. Therefore, owing to the rare earth permanent magnets 26 of high magnetic energy product arranged in the cavities 25 close to the outer periphery of the rotor 23, the rotating machine becomes to be strong against demagnetization thereby to maintain the stable characteristics over a long term.

Figure 22:
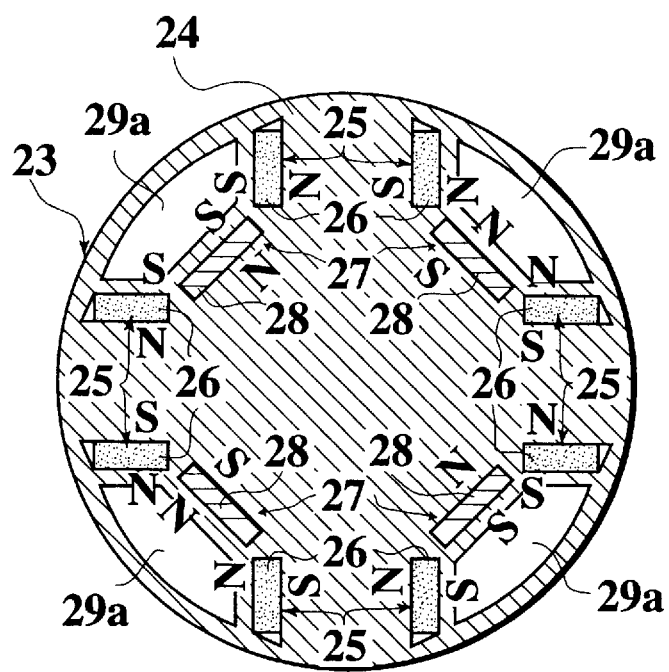
FIG. 22 is a cross sectional view of a rotor of a modification of a reluctance type rotating machine in accordance with a nineteenth embodiment of the present invention, taken along the radial direction of the machine.

FIG. 22 shows a modification of the reluctance type rotating machine of the nineteenth embodiment of the present invention. This reluctance type rotating machine has relatively large cavities 29a in the interpole portions. These cavities 29a serve as magnetic reluctance in the interpole portion to the permanent magnets 26 arranged along the magnetic pole. Consequently, the magnetic fluxes from the permanent magnets 26 through the cavities 29a to the armature windings 22 are considerably reduced. Considerable amount of the magnetic fluxes from the permanent magnets 26 pass through rotor core 24 surrounding the permanent magnets 26, namely, through a portion between the permanent magnets 26 and the outer surface of the rotor core 24 and a radially inward portion from the permanent magnets 26. Almost magnetic fluxes from the permanent magnets 26 are confined in the rotor core 24. Thus, it is possible to considerably reduce the induced voltage by the permanent magnets 26. Consequently, the rate of voltage of the permanent magnets 26 to the power supply voltage decreases, so that variable voltage range becomes wide. Namely, variable speed range becomes wide. In addition, because of a little magnetic fluxes of the permanent magnets 26; iron loss can be effectively reduced at low load or unload operation.

[20th. embodiment]

Figure 23:
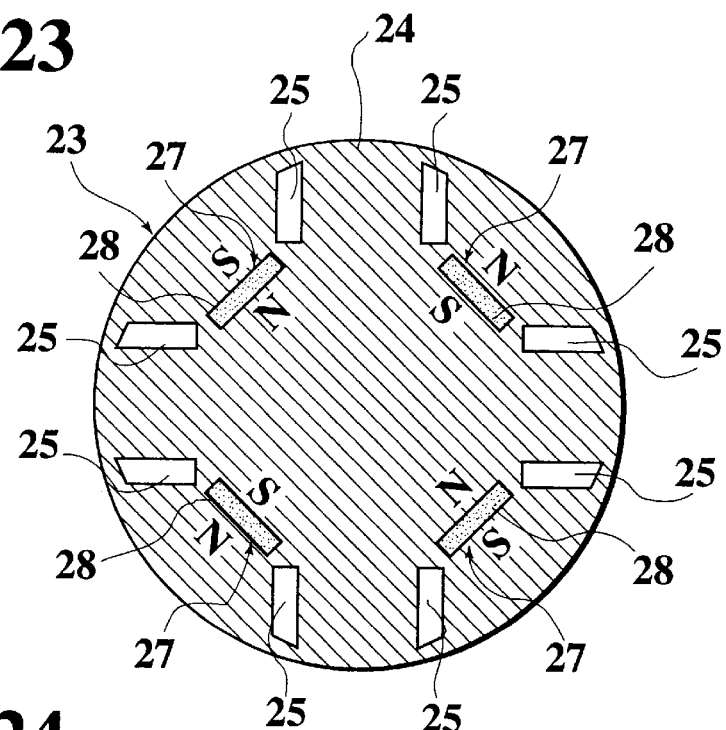
FIG. 23 is a cross sectional view of a rotor of a reluctance type rotating machine in accordance with a twentieth embodiment of the present invention, taken along the radial direction of the machine.

FIG. 23 is a cross sectional view of a reluctance type rotating machine in accordance with the twentieth embodiment of the present invention, taken along the radial direction of a rotor of the machine. Different from the nineteenth embodiment, the only permanent magnets 28 are accommodated in the cavities 27 between the magnetic poles, while no magnets are accommodated in the cavities 25 along the pole-axes in this embodiment.

Since the rotating machine of the embodiment is provided with the cavities 25 with no permanent magnet, the magnetic field due to the fluxes B3 of FIG. 18 vanishes, so that the only action caused by the high magnetic reluctance of the cavities 25 has an influence on the armature fluxes. For this reason, as the fluxes B2 due to the armature current in the direction of interpole-axes are increased, the variation range of the gap flux density is reduced, so that the power output of the machine is also lowered. However, with the decreased number of permanent magnets installed in the rotating machine (for example, less than about one half of the normal number), it is possible to realize the reduction of cost in producing the machine.

In addition, since the permanent magnets 28 of the embodiment are secluded in the rotor core 24, the magnetic fluxes leaking into the rotor core 24 are increased while the diamagnetic field of the magnets 28 becomes smaller. Taking account of B—H property of a demagnetizing curve, the operative point can be raised since the magnetic paths of fluxes increase in parallel, whereby the rotor is magnetically stabilized thereby to become stronger against the demagnetization. Further, as the demagnetizing field due to the armature reaction is distributed more intensely as it approaches the outer periphery of the rotor 23, the above-mentioned inmost positioning of the permanent magnets 28 allows the influence of the armature reaction to be moderated. As a result, it is possible to prevent the demagnetization of permanent magnets due to temperature and armature reaction, whereby the stable characteristics of the machine can be obtained for a long term.

Note, although the permanent magnets 28 are accommodated in the oblong cavities 27 in this embodiment, they may be arranged in the fan-shaped cavities 27 shown in FIGS. 14 to 17 in the modification.

[21st. embodiment]

Figure 24:
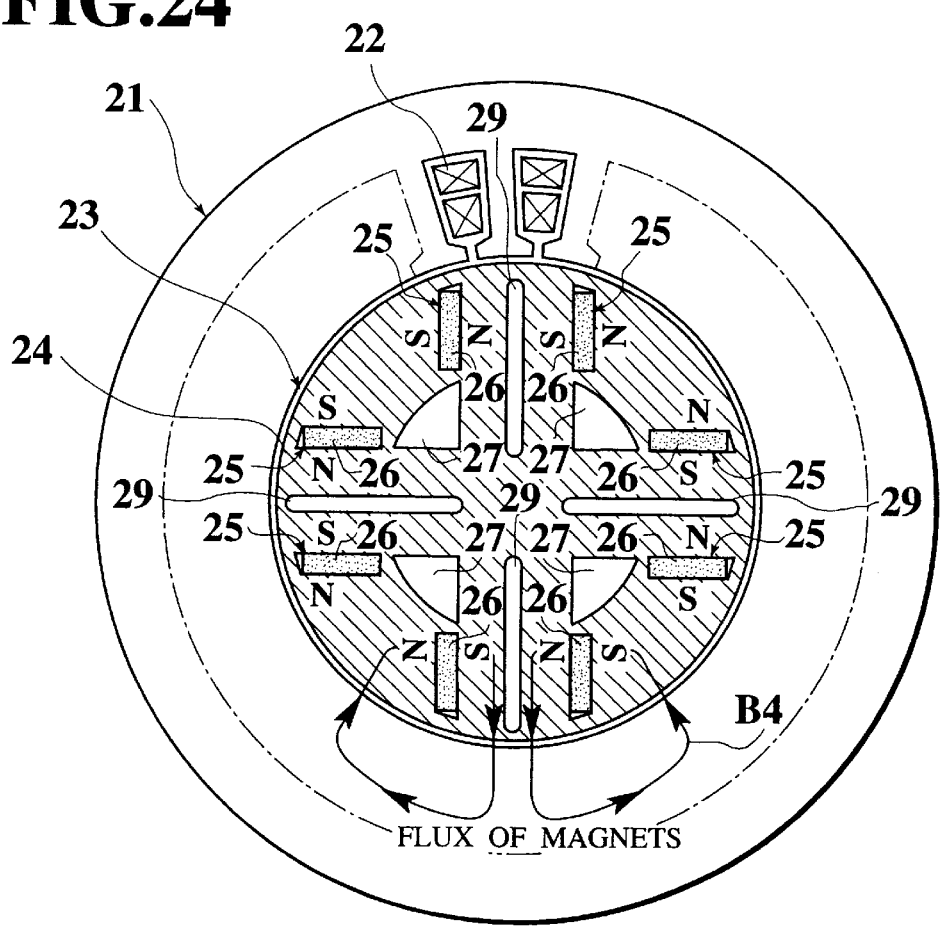
FIG. 24 is a cross sectional view of a rotor of a reluctance type rotating machine in accordance with a twenty-first embodiment of the present invention, taken along the radial direction of the machine.

FIG. 24 is a cross sectional view of a reluctance type rotating machine in accordance with the twenty first embodiment of the present invention, taken along the radial direction of a rotor of the machine. According to the embodiment, the rotor core 24, which is similar to the rotor core 24 of FIG. 16, further includes four elongated (slit-shaped) cavities 29 formed so as to extend at respective centers of the magnetic poles in the radial direction of the rotor 23.

Since the magnetic reluctance in the direction of crossing the magnetic poles is increased by the slit-shaped cavities 29, the flux components in the direction of the interpole-axes due to the armature current is reduced. Further, since the fluxes of the permanent magnets 26 in the cavities 25 along the pole-axes are interrupted by the slit-shaped cavities 29, the magnetic fluxes B4 of the permanent magnets 26 firstly flow in the directions along the cavities 29 in the magnetic poles. Then, the fluxes B4 pass through the stator core via the gap and returns to the magnets 26 finally.

The above-mentioned slit-shaped cavities 29 may be provided in the permanent magnet and reluctance type rotating machines of FIGS. 14 and 15. Similarly, the cavities 29 may be formed in the rotating machines of FIGS. 19 and 21.

Note, in common with the above-mentioned rotating machines of FIGS. 14 to 16 and FIGS. 19 to 24, if a ratio of each pole-width (i.e. a width of the rotor core portion interposed by two opposing cavities 25 on both sides of each magnetic pole) to a pole pitch (i.e. a circumferential distance from an outside center of one pole to an outside center of the neighboring pole) is established from 0.3 to 0.5, it is possible to increase the change in the distribution of gap flux density effectively, whereby the rotating machine of high power output can be realized.

Further, when the rotor core 24 is constituted by laminated electromagnetic steel plates such as silicon steel plates, it is possible to provide the cavities 25, 27 (and the cavities 29 as the case may be) by punching the plates, which is desirable in production. Additionally, since the electric resistance in the direction of lamination is increased, it is possible to decrease an eddy current which arises on the core surface in harmonic magnetic field and reduce an eddy current spreading over each permanent magnet by harmonic flux, simultaneously.

Also in the above-mentioned 15th. to 21st. embodiment, if the cavities having no magnet in the cavities 25, 27 (and the cavities 29 as the case may be) are occupied with non-magnetic material members, the strength of the rotor can be improved due to the resultant solid structure. Alternatively, when conductive non-magnetic materials are embedded in the above cavities having no magnet, the resulting eddy current generating in the conductive materials makes the rotating machine to self-start to operate and allows the influence of harmonic magnetic field to be restrained.

[22nd. embodiment]

Figure 25:
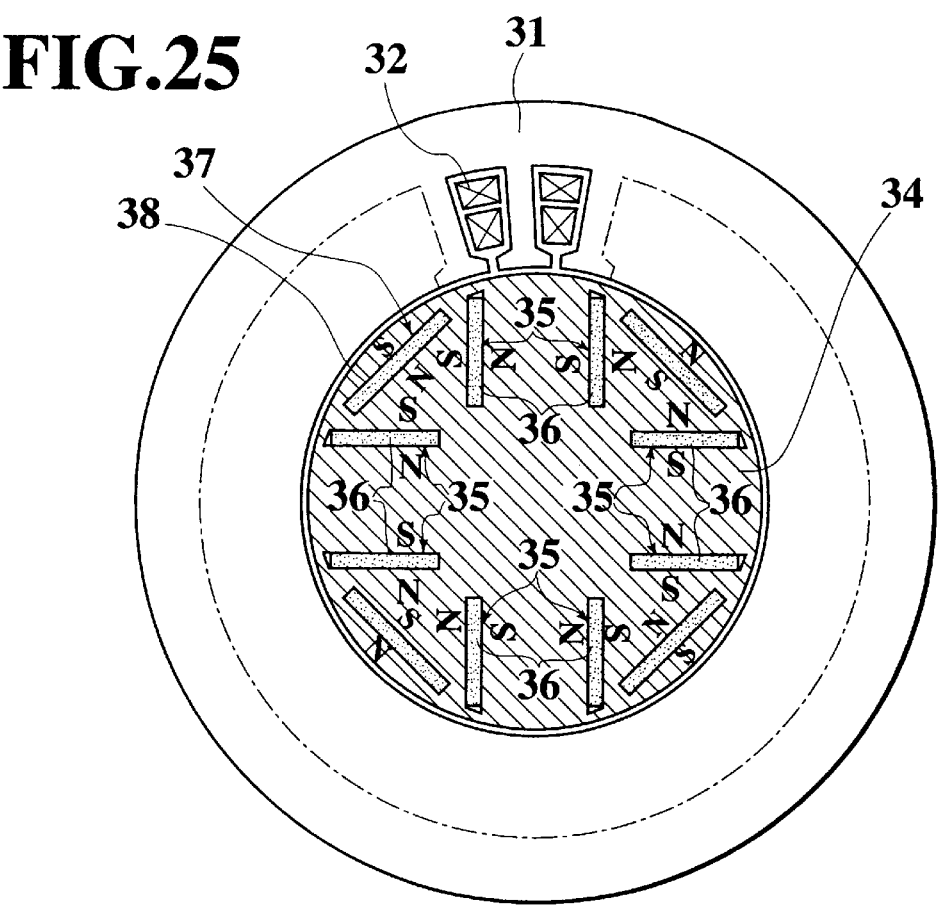
FIG. 25 is a cross sectional view of a rotor of a reluctance type rotating machine in accordance with a twenty-second embodiment of the present invention, taken along the radial direction of the machine.

FIG. 25 is a cross sectional view of a reluctance type rotating machine in accordance with the twenty-second embodiment of the present invention, taken along the radial direction of a rotor of the machine. The rotating machine of the embodiment comprises a stator 31 having tetra-polar type armature windings 32 and a rotor 33 constituted by a cylindrical rotor core 34. The rotor core 34 is constituted by either one of a cylindrical member made of soft carbon steel S45C and stacks of circular silicon steel plates. Arranged along each pole-axis of the rotor core 34 are a pair of oblong cavities 35 which are apart from each other at a pole-width. As the tetra-polar type armature windings 32 of the embodiment has four magnetic poles arranged in a cross-shaped manner, two cavities 35 are arranged so as to interpose each magnetic pole therebetween. Additionally, another kind of oblong cavities 37 are formed along an outer periphery of the rotor core (portions) 34 among the respective poles. Permanent magnets 36, 38 in Nd—Fe—B alloy families are inserted into the cavities 35, 37 and fixed therein by means of adhesive agents.

Each permanent magnet 36 along the pole-axis is magnetized in a direction perpendicular to the pole-axis, while each magnet 38 on the periphery is magnetized in the radial direction of the rotor 33. As to the magnetizing direction, the permanent magnets 36, 38 are magnetized in a manner that fluxes from the magnets 36 and fluxes from the magnets 38 intensify each other in the respective core portions among the magnetic poles.

The so-constructed rotating machine operates as follows.
[Re. principles to produce high-torque]

Figure 26:
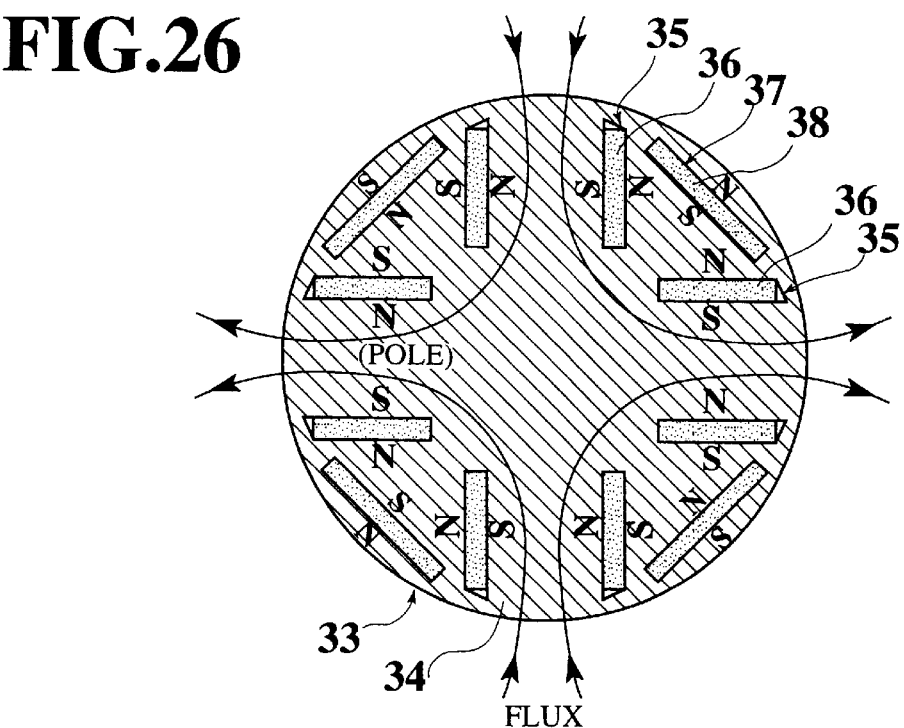
FIG. 26 is a cross sectional view of the rotor of the reluctance type rotating machine of the twenty-second embodiment, showing respective flows of fluxes of armature windings in the directions of pole-axes.

FIG. 26 shows respective magnetic fluxes produced by the armature windings, in the directions along the pole-axes. Since the magnetic fluxes employ the rotor core (portions) 34 at the magnetic poles as magnetic paths, the magnetic reluctance in the directions is so small as to provide a magnetic structure where it is easy for the fluxes to flow.

Figure 27:
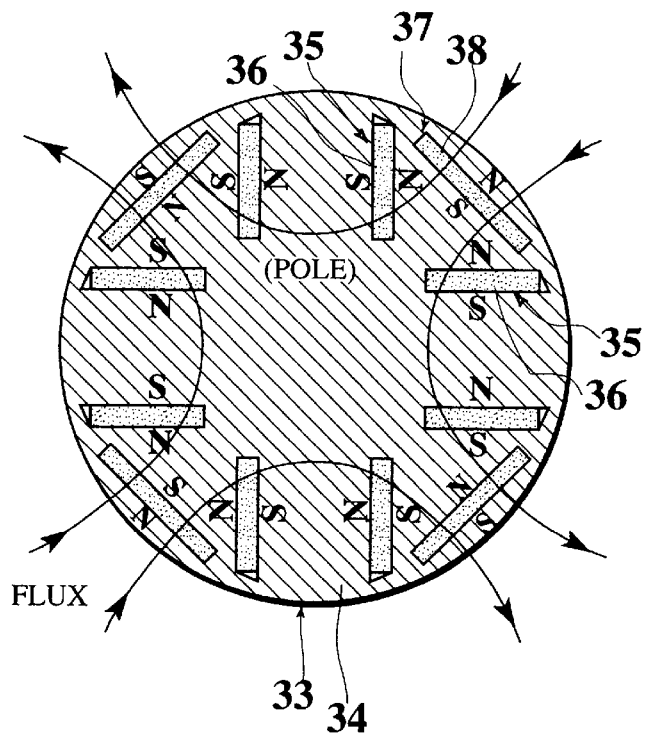
FIG. 27 is a cross sectional view of the rotor of the reluctance type rotating machine of the twenty-second embodiment, showing respective flows of fluxes of armature windings in the directions of interpole-axes.

FIG. 27 shows other magnetic fluxes produced by the armature windings, in the directions along interpole-axes. As mentioned above, since the permanent magnets 36 are magnetized in the directions substantially perpendicular to the pole-axes, they operate to repel the fluxes invading through the interpole portions of the rotor core 34. Further, since the opposing permanent magnets 36 along each magnetic pole are magnetically connected in a short circuit at an inside core portion of the rotor core 34, the action of repelling the armature fluxes is large. Additionally, since the relative permeability of the permanent magnet 36 amounts to approx. 1, there is a tendency to increase the magnetic reluctance in the magnetic paths passing through the permanent magnets 36. Therefore, the magnetic fluxes of the armature windings 32 do not flow through the substantial interpole portions but the core portions in the magnetic poles. Note, the permanent magnets 38 on the periphery of the rotor 33 have similar functions to repel the armature fluxes and raise the magnetic reluctance as well.

As a result, owing to the formation of irregularities in the gap flux distribution, it is possible to produce a great reluctance torque for the rotating machine due to an increased change in magnetic energy. In addition, since the fluxes of the permanent magnets 38 are interlinked with the armature windings 32, an additional torque is also produced thereby to provide the machine with high torque accordingly.

[Re. the range of adjusting terminal voltage, enabling machine to operate with a wide range of adjustable speeds]

Since the magnetic fluxes of the magnets 36 along the pole-axes are mainly distributed in the rotor core 34, the fluxes interlinking with the armature windings 32 is almost constituted by the fluxes due to the permanent magnets 38 on the periphery of the rotor core 34. That is, since the permanent magnet-reluctance type rotating machine of the embodiment includes the permanent magnets 38 arranged in the periphery of the rotor core (interpole portions) 34, the surface area of the permanent magnets is reduced in comparison with that of the conventional permanent magnet type rotating machine having the permanent magnets attached on the outer surface of the rotor and similarly, the amount of interlinkage flux is also reduced. In FIGS. 25, 26 and 27, the permanent magnets 36, 38, 38a, 38b are surrounded by the magnetic material, the amount of interlinkage flux is reduced because of magnetic short circuit, so that iron loss can be reduced. The terminal voltage is induced by combining the interlinkage flux due to the permanent magnets 38 with the interlinkage flux due to the armature current (exciting current component of reluctance motor and torque current component). It means that to adjust the exciting current component allows the terminal voltage to be adjusted in a wide range. That is, it is possible to operate the rotating machine at variable speeds within a wide range in spite of power source of constant-voltage.

Note, when the ferrite magnets of low magnetic energy product are used for the permanent magnets 36 for repelling the fluxes flowing along the pole-axes while the rare earth permanent magnets of high magnetic energy product, such as Nd—Fe—B magnets, is used for the permanent magnets 38, it is possible to accomplish the rotating machine with high torque. Further, if the ferrite magnets are employed for the permanent magnets 36, the large magnetic field can be formed in spite of small magnetic energy product of the ferrite magnets since each permanent magnet 36 along the pole-axis provides a magnetically-short circuit having a magnetic path of the inside core portion, whereby a sufficient reluctance torque can be obtained.

Again, the ferrite magnet for the permanent magnets 36 may be replaced with a bond magnet. Although the bond magnet has a low magnetic energy product, it can repel the armature fluxes flowing between the pole-axes sufficiently, whereby the similar effects to the case of the ferrite magnet can be obtained. Generally, since the bond magnet is produced by solidifying magnetic powder by resin, the magnet has a great degree of freedom in configuration. Further, when the bond magnets are formed integrally with the rotor core 34 by means of injection molding etc., the manufacturing of the rotor would be facilitated.

[23rd. embodiment]

Figure 28:
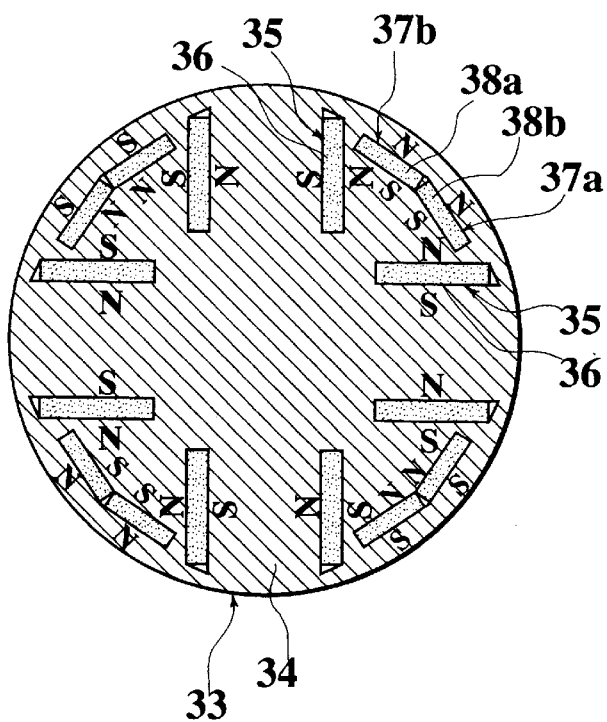
FIG. 28 is a cross sectional view of a rotor of a reluctance type rotating machine in accordance with a twenty-third embodiment of the present invention, taken along the radial direction of the machine.

FIG. 28 is a cross sectional view of a reluctance type rotating machine in accordance with the twenty-third embodiment of the present invention, taken along the radial direction of a rotor of the machine. In the rotating machine of this embodiment, each of the above cavities 37 (FIG. 25) is composed of small-sized cavity parts 7a, 7b in which permanent magnets 38a, 38b are inserted and adhesively secured, respectively. Each of the magnets 38a, 38b is formed of the same dimensions as those of the permanent magnet 36.

According to the embodiment, with the above-mentioned structure of the cavities 37, it is possible to employ small-sized magnets for the permanent magnets 38a, 38b. Further, with the use of magnets identical to the permanent magnets 36 along the pole-axes, the number of kinds of parts can be minimized thereby to improve the productivity. The thickness of a core portion between the permanent magnets 38a, 38b and the outer periphery of the rotor core 34 can be adjusted by changing an angle of the magnet 38a against the magnet 38b. Thus, by adjusting a radial thickness of the outside core portion, it is possible to control an amount of fluxes leaking to outer peripheral core portions between the magnetic poles.

[24th. embodiment]

Figure 29:
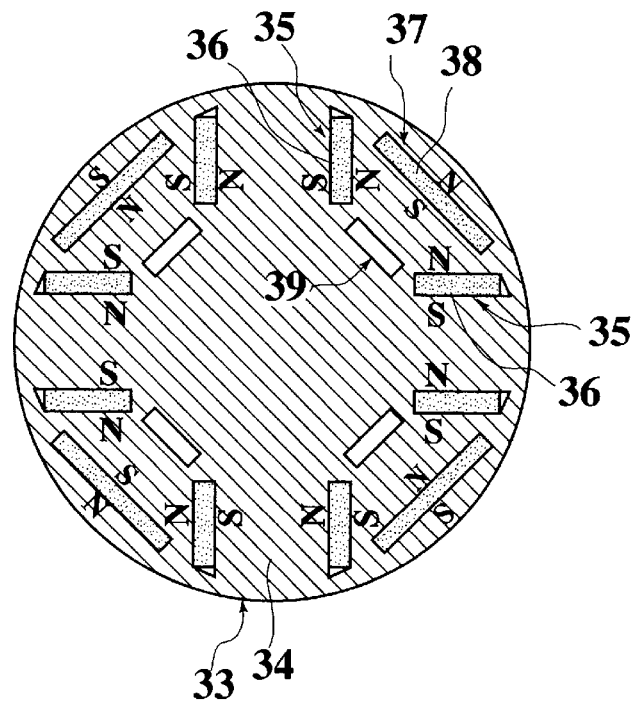
FIG. 29 is a cross sectional view of a rotor of a reluctance type rotating machine in accordance with a twenty-fourth embodiment of the present invention, taken along the radial direction of the machine.

FIG. 29 is a cross sectional view of a rotor of a reluctance type rotating machine in accordance with the twenty-fourth embodiment of the present invention.

The rotor 33 of the embodiment is similar to that of the twenty-second embodiment of FIG. 25. A difference therebetween resides in that the rotor 33 of this embodiment is provided, in respective interpole core portions thereof, with inner oblong cavities 39 each of which forms a trapezoidal area in each interpole core portion together with the other cavities 35, 37.

Similarly to the 22nd. embodiment, the permanent magnets 36, 38 in Nd—Fe—B alloy families are inserted into the cavities 35, 37 and fixed therein by means of adhesive agents, while no magnet is inserted into the cavities 39. Each permanent magnet 36 along the pole-axis is magnetized in a direction perpendicular to the pole-axis, while each magnet 38 on the periphery is magnetized in the radial direction of the rotor 33. As to the magnetizing direction, the permanent magnets 36, 38 are magnetized in a manner that fluxes from the magnets 36 and fluxes from the magnets 38 intensify each other in the respective core portions among the magnetic poles.

Therefore, the operation of the rotating machine is also similar to that of the machine of the 22nd. embodiment. Note, according to the embodiment, the magnetic reluctance is increased at a center portion of each interpole core portion owing to the provision of the third cavities 39. Therefore, the magnetic fluxes of the armature windings 32 do not flow through the substantial interpole portions but the core portions of the magnetic poles. Note, the permanent magnets 38 on the periphery of the rotor 33 have similar functions to repel the armature fluxes and raise the magnetic reluctance as well.

As a result, owing to the formation of irregularities in the gap flux distribution, it is possible to produce a great reluctance torque for the rotating machine due to an increased change in magnetic energy. In addition, since the fluxes of the permanent magnets 38 are interlinked with the armature windings 32, an additional torque is also produced thereby to provide the machine with high torque accordingly.

Figure 30:
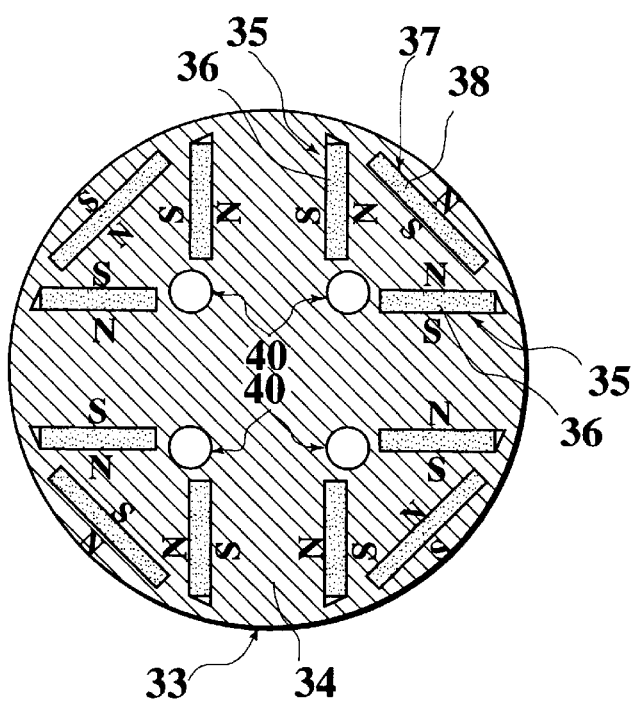
FIG. 30 is a cross sectional view of a rotor in a modification of the twenty-fourth embodiment of the present invention, taken along the radial direction of the machine.

In the modification of the embodiment, as shown in FIG. 30, circular cavities 40 may be formed in place of the above cavities 39. Such a configuration of the cavity 40 would be effective in view of strength in case of the rotor of a small diameter or in case that the number of magnetic poles is large for the small diameter. The magnetic properties of the rotor 33 is similar to that of the rotor shown in FIG. 29.

[25th. embodiment]

Figure 31:
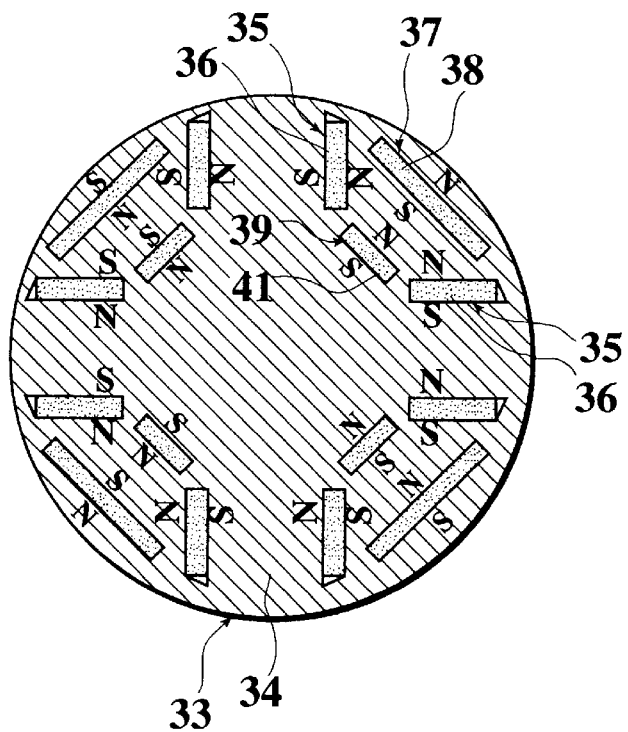
FIG. 31 is a cross sectional view of a rotor of a reluctance type rotating machine in accordance with a twenty-fifth embodiment of the present invention, taken along the radial direction of the machine.

FIG. 31 is a cross sectional view of a rotor of a reluctance type rotating machine in accordance with the twenty-fifth embodiment of the present invention.

The rotor 33 of the embodiment is similar to that of the embodiment of FIG. 29. A difference therebetween resides in that permanent magnets 41 are accommodated in the cavities 39.

All of the permanent magnets 36, 38, 41 of the cavities 35, 37, 39 are magnets in the Nd—Fe—B alloy families. Each permanent magnet 36 along the pole-axis is magnetized in a direction perpendicular to the pole-axis, while each magnet 38 and each magnet 41 are together magnetized in the radial direction of the rotor 33. As to the magnetizing direction, the permanent magnets 36, 38, 41 are magnetized in a manner that respective fluxes from the magnets 36, 38, 41 intensify each other.

According to the embodiment, since the cavities 39 are filled up with the permanent magnets 41, the magnetic fluxes due to the permanent magnets can be increased with the addition of fluxes by the permanent magnets 41. In other words, with the increased fluxes interlinking with the armature windings, it is possible to increase torque resulting from Fleming's left-hand rule.

Note, also in the embodiments of FIGS. 28 to 31, either a combination of the rare earth magnets and the ferrite magnets or another combination of the rare earth magnets and bond magnets may be employed in order to realize high torque effectively.

[26th. embodiment]

Figure 32:
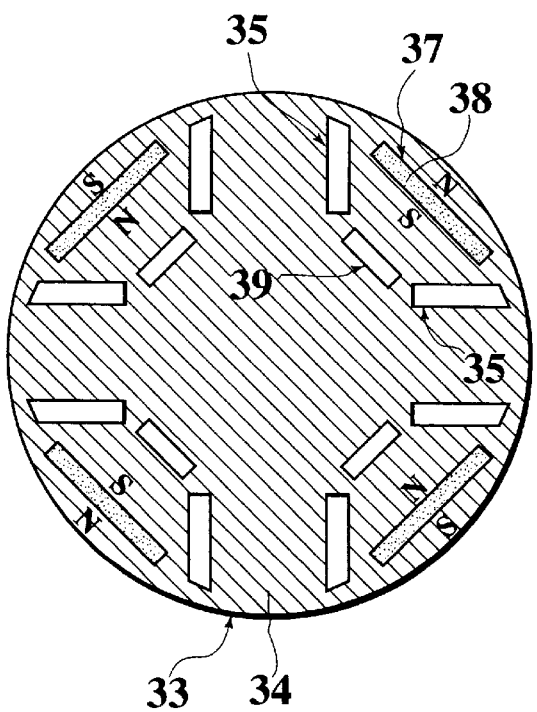
FIG. 32 is a cross sectional view of a rotor of a reluctance type rotating machine in accordance with a twenty-sixth embodiment of the present invention, taken along the radial direction of the machine.

FIG. 32 is a cross sectional view of a rotor of a reluctance type rotating machine in accordance with the twenty-sixth embodiment of the present invention.

In terms of arrangement of cavities, the rotor 33 of the embodiment is similar to that of the embodiment of FIG. 29. However, the permanent magnets 38 are inserted only in the cavities 37.

According to the embodiment, since there are no magnets in the cavities 35 along the pole-axes, the repel-action of the permanent magnets is lost, so that the fluxes of the armature windings 32 passing through the interpole core portions are reduced only by the high magnetic reluctance of the cavities 35. Accordingly, although the torque of the machine is reduced, the rotor structure is simplified by elimination of the magnets 36 (FIG. 31) along the pole-axes, so that the manufacturing of the machine can be facilitated.

Note, in the modification of the embodiment, the above-mentioned arrangement of the permanent magnets 38 is applicable to the rotors 33 of FIGS. 25, 30.

Further, when the cavities 35, 39 (or 40) having no magnet accommodated therein are filled up with non-magnetic materials, the strength of the rotor is reinforced owing to the resultant sold structures. Alternatively, when conductive non-magnetic materials are embedded in the above cavities 35, 39 (or 40), the resulting eddy current generating in the conductive materials makes the rotating machine to self-start to operate and allows the influence of harmonic magnetic field to be restrained.

[27th. embodiment]

Figure 33:
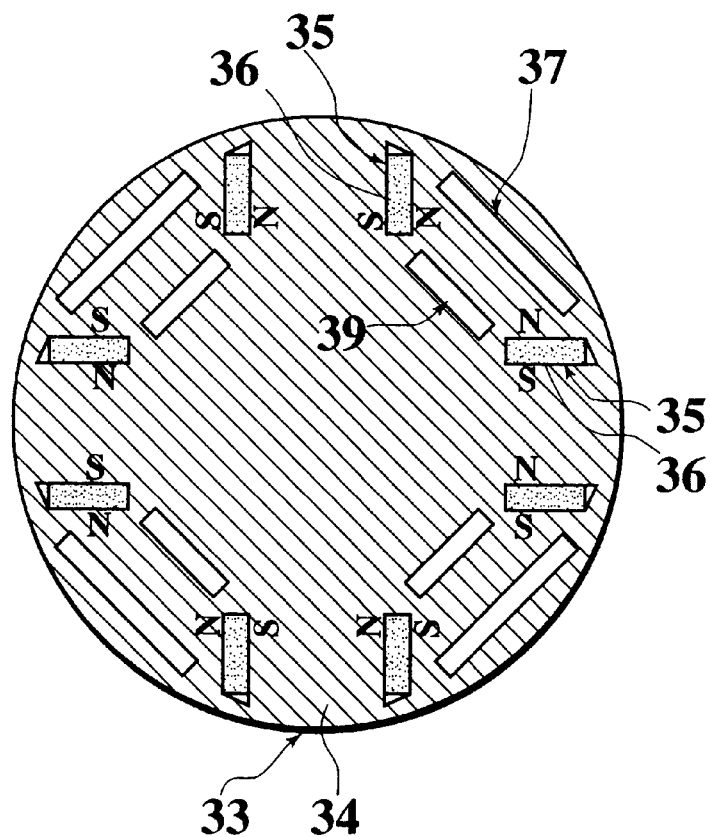
FIG. 33 is a cross sectional view of a rotor of a reluctance type rotating machine in accordance with a twenty-seventh embodiment of the present invention, taken along the radial direction of the machine.

FIG. 33 is a cross sectional view of a rotor of a reluctance type rotating machine in accordance with the twenty-seventh embodiment of the present invention.

In terms of arrangement of cavities 35, 37, 39, the rotor 33 of the embodiment is similar to that of the embodiment of FIG. 29. In this embodiment, however, the permanent magnets 36 are inserted only in the cavities 35 along the pole-axes.

According to the embodiment, since the resulting torque resulting from the interlinkage of fluxes of the permanent magnets with the armature windings 32 is almost lost, the reluctance torque will be the leader of torque. Consequently, although the torque of the machine is reduced similarly, the rotor structure is simplified by elimination of the magnets 38 (FIG. 29) on the periphery, so that the manufacturing of the machine can be facilitated.

Note, in the modification of the embodiment, the above-mentioned arrangement of the permanent magnets 36 is applicable to the rotors 33 of FIGS. 25, 30.

Further, when the cavities 35, 39 (or 40) having no magnet accommodated therein are filled up with non-magnetic materials, the strength of the rotor is reinforced owing to the resultant sold structures. Alternatively, when conductive non-magnetic materials are embedded in the above cavities 35, 39 (or 40), the resulting eddy current generating in the conductive materials makes the rotating machine to self-start to operate and allows the influence of harmonic magnetic field to be restrained.

[28th. embodiment]

Figure 34:
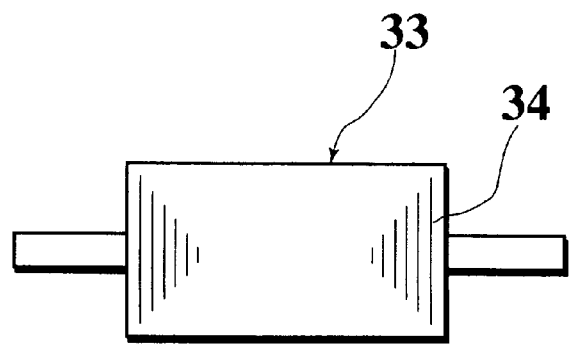
FIG. 34 is a cross sectional view of a rotor of a reluctance type rotating machine in accordance with a twenty-eighth embodiment of the present invention, taken along the axial direction of the machine.

Next, we describe a reluctance type rotating machine in accordance with the twenty-seventh embodiment of the present invention, with reference to FIG. 34. The embodiment is characterized in that the rotor core 34 of the rotor 30 of FIG. 25 is formed by laminated silicon-steel plates. In manufacturing, prior to laminating, each of the plates is previously punched to form the cavities 35, 37 of the rotor 33. Owing to the laminating structure, since the electric resistance is increased in the laminating direction, it is possible to reduce the eddy current generated on the core surface by the harmonic magnetic field.

Note, of course, the above-mentioned laminating structure is applicable to the rotor cores 34 in the afore-mentioned embodiments of FIGS. 28 to 33.

[29th. embodiment]

Figure 35:
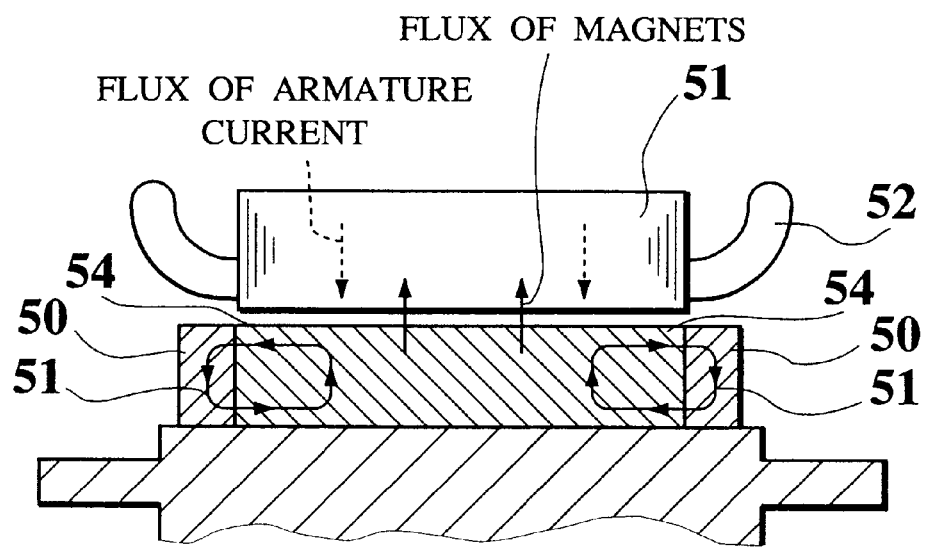
FIG. 35 is a cross sectional view of a reluctance type rotating machine in accordance with a twenty-ninth embodiment of the present invention, taken along the axial direction of the machine.

We now describe the twenty-ninth embodiment of the invention with reference to FIG. 35. The permanent magnet and reluctance type rotating machine of the embodiment is characterized by a pair of magnetic end rings 50 which are disposed on both axial ends of the rotor core 24 of the afore-mentioned rotating machine of FIGS. 14.

The rotating machine of the embodiment operates as follows.

As shown in FIG. 35, when the armature reaction field in the opposite direction of the magnetized direction of each permanent magnet 26 (FIG. 14), 28 (FIGS. 20 and 21) in the rotor core 24 is exerted by the current of the armature windings 22, a part of the magnetic fluxes from the permanent magnet 26, 28 forms closed magnetic paths 51 each of which is composed of a path (part) along the rotational axis of the rotor, a subsequent path (part) passing through the end ring 50 and a subsequent path (part) to returning the core 24. That is, according to the embodiment, the fluxes can be produced effectively. Thus, it is possible to adjust interlinkage fluxes between the armature windings 22 and the permanent magnets 26, 28, so that the terminal voltage can be easily adjusted by the armature current.

Note, although we have described the 22nd. embodiment by way of the magnetic end ring 50 in combination with the rotating machine of the fifteenth embodiment (FIG. 14), of course, the magnetic end ring 50 is applicable to any one of the above-mentioned embodiments (e.g. FIGS. 25–34).

[30th. embodiment]

Figure 36:
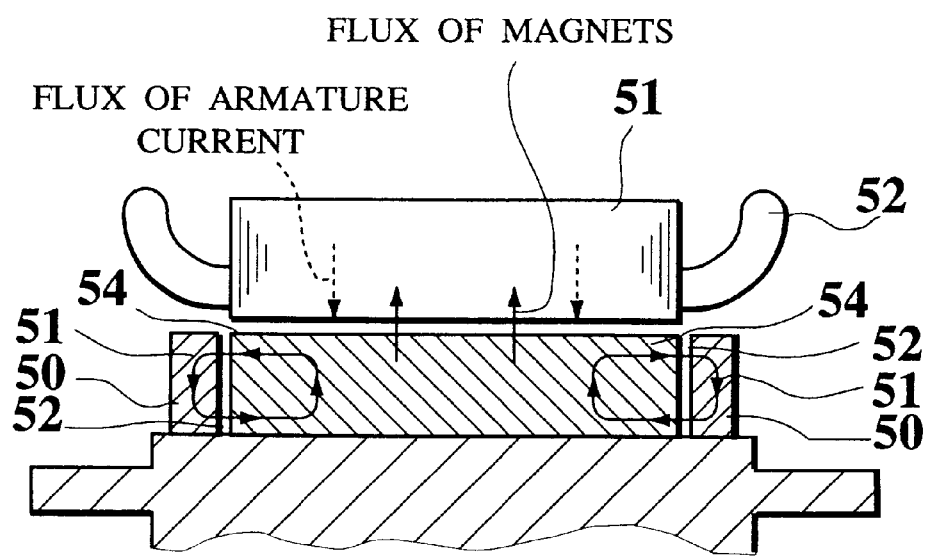
FIG. 36 is a cross sectional view of a reluctance type rotating machine in accordance with a thirtieth embodiment of the present invention, taken along the axial direction of the machine.

Next, we describe the thirtieth embodiment of the invention with reference to FIG. 36. The permanent magnet and reluctance type rotating machine of the embodiment is characterized by a structure where the above-mentioned magnetic end rings 50 are arranged on both axial ends of the rotor core 24 through clearances 52, respectively.

Similarly to the 22nd. embodiment, when the armature reaction field in the opposite direction of the magnetization of each permanent magnet 26, 28 (FIGS. 14, 20–23) in the rotor core 24 is exerted by the current of the armature windings 22, a part of the magnetic fluxes from the permanent magnet 26, 28 forms the closed magnetic paths 51 to produce the fluxes effectively. Thus, it is possible to adjust the interlinkage fluxes between the armature windings 22 and the permanent magnets 26, 28, so that the terminal voltage can be easily adjusted by the armature current. In addition, according to the embodiment, it is possible to control the ratio of fluxes to effective fluxes by adjusting a length of the clearance 52 between the rotor core 24 and each of the magnetic end rings 50.

[31th. embodiment]

Figure 37:
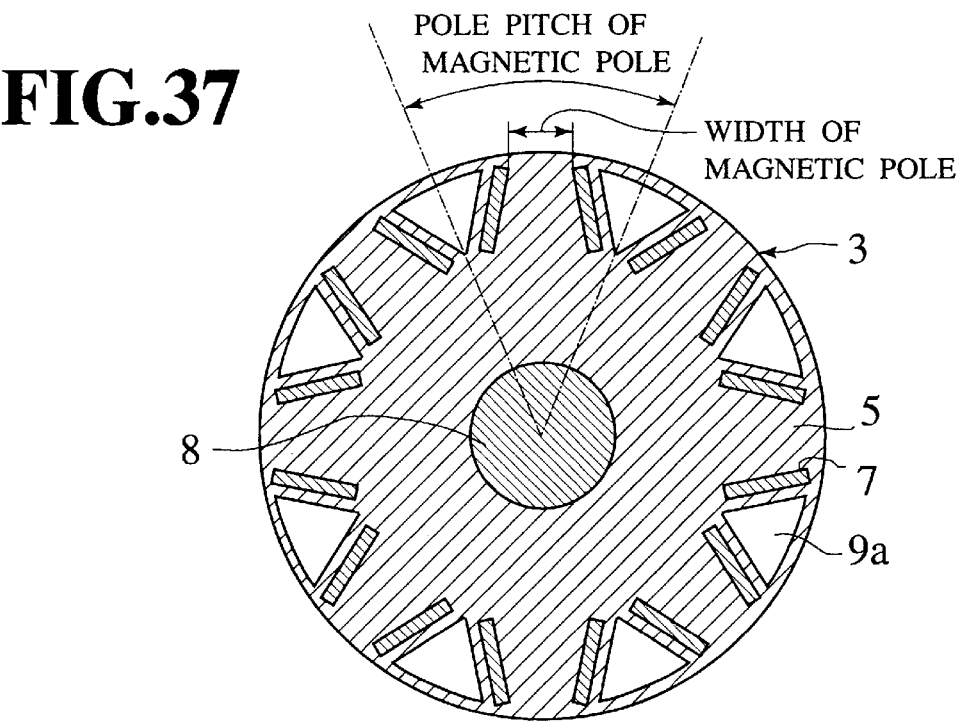
FIG. 37 is a cross sectional view of a reluctance type rotating machine in accordance with a thirty-first embodiment of the present invention.

FIG. 37 shows a eight pole reluctance type rotating machine as a thirty-first embodiment of the present invention. This embodiment corresponds to FIG. 11, the ninth embodiment. In this embodiment, a ratio of each pole-width to a pole pitch (i.e. a circumferential distance from an outside center of one pole to an outside center of the neighboring pole) is established from 0.3 to 0.35.

[32th. embodiment]

Figure 38:
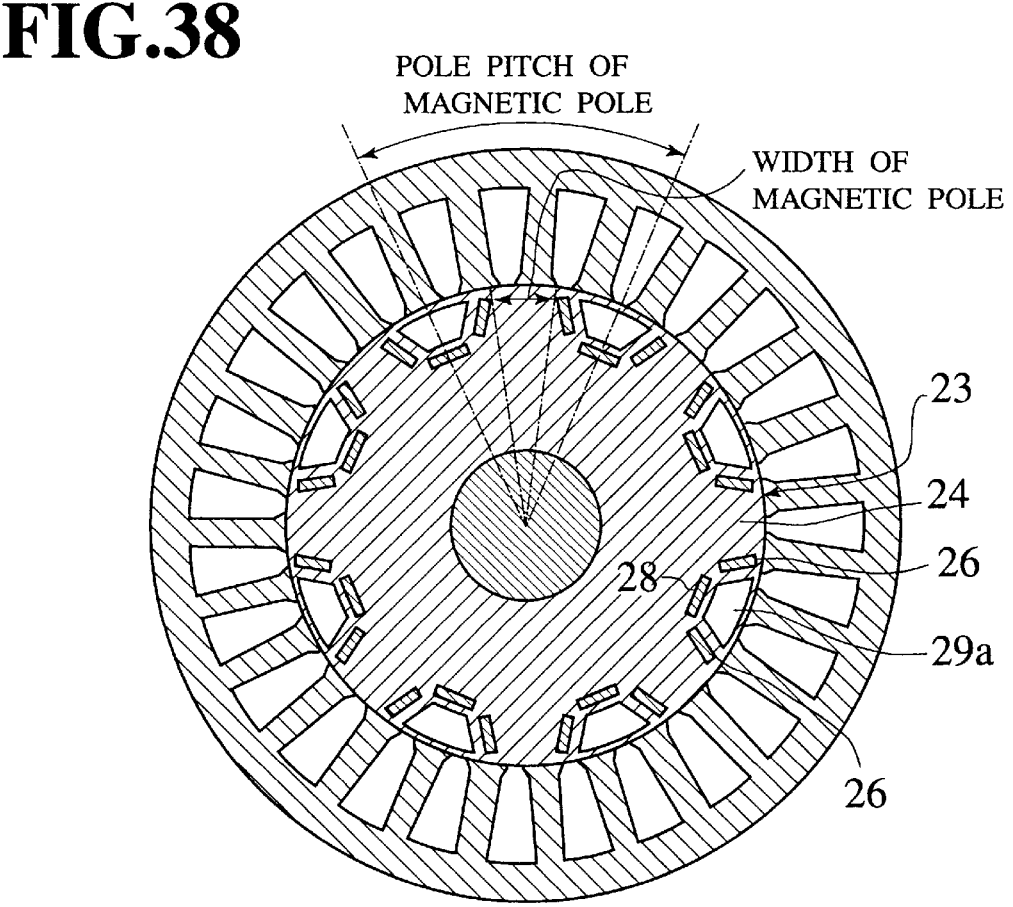
FIG. 38 is a cross sectional view of a reluctance type rotating machine in accordance with a thirty-second embodiment of the present invention

FIG. 38 shows a eight pole reluctance type rotating machine as a thirty-second embodiment of the present invention. This embodiment corresponds to FIG. 22, a modification of the ninteenth embodiment. In this embodiment, a ratio of each pole-width to a pole pitch (i.e. a circumferential distance from an outside center of one pole to an outside center of the neighboring pole) is established from 0.3 to 0.35.

Of course, the above-mentioned structure is applicable to any one of the above-mentioned embodiments.

Throughout the embodiments, by adjusting a radial thickness of the outside core portion, it is possible to control an amount of fluxes leaking to outer peripheral portions between the magnetic poles.

Throughout the embodiments, a ratio of each pole-width to a pole pitch (i.e. a circumferential distance from an outside center of one pole to an outside center of the neighboring pole) is established from 0.3 to 0.5 for all reluctance type motor, irrespective of the number of poles. The ratio of each pole-width to a pole pitch is more preferably 0.3 to 0.35 for all reluctance type motor, irrespective of the number of poles.

Finally, it will be understood by those skilled in the art that the foregoing description is one of preferred embodiments of the rotating machine, and that various changes and modifications may be made to the present invention without departing from the spirit and scope thereof.

What is claimed is:

1. A reluctance type rotating machine comprising:
   a stator having armature windings arranged on an inner periphery of said stator;
   a rotor arranged radially inward said stator through a gap, said rotor including a rotor core provided with magnetic poles and interpole portions between said magnetic poles; and
   a plurality of permanent magnets arranged in said rotor, wherein said permanent magnets are not spaced apart at intervals equal to an arcuate length of said permanent magnets,
   whereby magnetic fluxes of said permanent magnets repel fluxes of said armature windings leaking toward said interpole portions.

2. A reluctance type rotating machine as claimed in claim 1, wherein said rotor core has irregularities formed on a peripheral surface thereof on the side of said gap, said irregularities consisting of projection portions and recess portions, and each of said permanent magnets is arranged on each side face of said projection portions in the circumferential direction of said rotor.

3. A reluctance type rotating machine as claimed in claim 2, wherein said projection portions are connected, at respective outer peripheries thereof, with each other through an intermediary of bridge members made of magnetic material.

4. A reluctance type rotating machine as claimed in claim 1, wherein said rotor core has irregularities formed on a peripheral surface thereof on the side of said gap, said irregularities consisting of projection portions and recess portions, and said permanent magnets are respectively accommodated in cavities formed in said projection portions, said cavities being positioned close to respective side faces of said projection portions in the circumferential direction of said rotor.

5. A reluctance type rotating machine as claimed in claim 4, wherein said projection portions are connected, at respective outer peripheries thereof, with each other through an intermediary of bridge members made of magnetic material.

6. A reluctance type rotating machine as claimed in claim 1, wherein said rotor core includes a plurality of cavities formed along an outer peripheral surface of said rotor so that each of said magnetic poles is defined between two of said cavities, and said permanent magnets are accommodated in said cavities adjacent to said magnetic poles respectively.

7. A reluctance type rotating machine as claimed in claim 6, wherein said cavities comprise a plurality of large cavities formed at respective centers of said interpole portions and a plurality of small cavities each formed between said magnetic pole and one of said large cavities to accommodate each of said permanent magnets therein.

8. A reluctance type rotating machine as claimed in claim 1, wherein said rotor core includes cavities formed along side faces of core portions defining said magnetic poles of said rotor, two of said cavities being arranged so as to form a V-shaped pattern in each of said interpole portions, and said permanent magnets are accommodated in said cavities, respectively.

9. A reluctance type rotating machine as claimed in claim 8, wherein said rotor core has additional cavities each formed at a center of said interpole portion interposed between said permanent magnets in the V-shaped pattern.

10. A reluctance type rotating machine as claimed in claim 8 or 9, wherein said rotor core of said rotor has core portions formed on both sides of each of said permanent magnets for flowing magnetic fluxes.

11. A reluctance type rotating machine as claimed in claim 10, wherein said permanent magnets are arranged in an inversed V-shaped pattern, viewed from a center of said rotor.

12. A reluctance type rotating machine as claimed in any one of claims 2, 4, 6 and 8, wherein said rotor core comprises laminated electromagnetic steel plates.

13. A reluctance type rotating machine as claimed in any one of claims 5, 6, 7 and 9, further comprising non-magnetic materials which are accommodated in said cavities having no permanent magnet accommodated therein.

14. A reluctance type rotating machine as claimed in claim 12, wherein said non-magnetic materials are conductive of electricity.

15. A reluctance type rotating machine as claimed in any one of claims 2, 4, 6 and 8, further comprising plural pairs of units each of which consists of said armature windings and a power element connected to said armature windings.

16. A reluctance type rotating machine as claimed in claim 1, wherein said rotor core includes a plurality of cavities formed along respective pole-axes of said magnetic poles, each of said cavities being oblong-shaped, and said permanent magnets are arranged in said cavities, respectively, said permanent magnets being magnetized in a manner that magnetic fluxes generated from said permanent magnets intensify each other in said interpole portions.

17. A reluctance type rotating machine as claimed in claim 1, wherein said rotor core includes a plurality of first cavities formed along respective pole-axes of said magnetic poles, each of said first cavities being oblong-shaped, and a plurality of second cavities formed radially inside said first cavities and disposed in said interpole portions, and said permanent magnets are arranged in said first cavities, respectively, said permanent magnets being magnetized in a manner that magnetic fluxes generated from said permanent magnets intensify each other in said interpole portions.

18. A reluctance type rotating machine as claimed in claim 17, wherein said second cavities are fan-shaped cavities each of which is formed so as to gradually widen from a base point thereof toward an outer periphery of said rotor core, said base point being close to a center of said rotor core.

19. A reluctance type rotating machine as claimed in claim 17, wherein said second cavities are shaped to be oblong.

20. A reluctance type rotating machine as claimed in any one of claims 17 to 19, further comprising non-magnetic materials which are accommodated in said second cavities, respectively.

21. A reluctance type rotating machine as claimed in claim 20, wherein said non-magnetic materials are conductive of electricity.

22. A reluctance type rotating machine as claimed in any one of claims 17 to 19, further comprising additional permanent magnets which are accommodated in said second cavities, respectively.

23. A reluctance type rotating machine as claimed in claim 22, wherein said permanent magnets in said first cavities have high magnetic energy products, while said permanent magnets in said second cavities have low magnetic energy products.

24. A reluctance type rotating machine as claimed in claim 23, wherein said second cavities are formed in the rotor core so as to leave a part of said rotor core between each of said permanent magnets in said first cavities and each of said second cavities.

25. A reluctance type rotating machine as claimed in claim 24, wherein said permanent magnets in said first cavities are arranged in a manner that respective outside ends of said permanent magnets are inside an outer periphery of said rotor core, leaving a part of said rotor core between said gap and each of said outside ends of said permanent magnets.

26. A reluctance type rotating machine as claimed in claim 1, wherein said rotor core includes a plurality of first cavities formed along respective pole-axes of said magnetic poles, each of said first cavities being oblong-shaped, and a plurality of second cavities formed radially-inside said first cavities and disposed in said interpole portions, and said permanent magnets are arranged in said second cavities, respectively.

27. A reluctance type rotating machine as claimed in claim 26, wherein said permanent magnets in said second cavities are magnetized in a radial direction of said rotor core.

28. A reluctance type rotating machine as claimed in claim 17 or 26, wherein a width of each of said magnetic poles is 0.3 to 0.5 times as long as a pole pitch of said magnetic poles.

29. A reluctance type rotating machine as claimed in claim 17 or 26, wherein said rotor core is provided, at respective centers of said magnetic poles, with slits extending in a radial direction of said rotor core.

30. A reluctance type rotating machine as claimed in claim 17 or 26, wherein said rotor core is composed of laminated electromagnetic steel plates.

31. A reluctance type rotating machine as claimed in claims 27, further comprising non-magnetic materials which are accommodated in said first cavities, respectively.

32. A reluctance type rotating machine as claimed in claim 31, wherein said non-magnetic materials are conductive of electricity.

33. A reluctance type rotating machine as claimed in claim 1, wherein said rotor core has a plurality of first cavities formed along respective pole-axes of said magnetic poles and a plurality of second cavities formed along outer peripheries of said interpole portions, said first and second cavities being oblong-shaped, and said permanent magnets are arranged in said first and second cavities and magnetized in a manner that respective fluxes generated from said permanent magnets intensify each other in said interpole portions.

34. A reluctance type rotating machine as claimed in claim 33, wherein each of said interpole portions is provided with a plurality of said second cavities.

35. A reluctance type rotating machine as claimed in claim 34, wherein said rotor core further includes a plurality of third cavities which are oblong-shaped in said interpole portions respectively and which are positioned radially inside said first cavities so as to define a generally rectangular area surrounded by said first, second and third cavities in each of said interpole portions.

36. A reluctance type rotating machine as claimed in claim 35, further comprising additional permanent magnets which are accommodated in said third cavities respectively and which are magnetized in a manner that fluxes of said permanent magnets in said first, second and third cavities intensify each other in respective interpole core portions.

37. A reluctance type rotating machine as claimed in claim 34, wherein said rotor core further includes a plurality of third cavities which are circular-shaped in said interpole portions respectively and which are positioned radially inside said first cavities so as to define a generally triangular area surrounded by said first, second and third cavities in each of said interpole portions.

38. A reluctance type rotating machine as claimed in claim 35 or 37, further comprising non-magnetic materials which are accommodated in said third cavities, respectively.

39. A reluctance type rotating machine as claimed in claim 38, wherein said non-magnetic materials are conductive of electricity.

40. A reluctance type rotating machine as claimed in claim 37, further comprising additional permanent magnets which are accommodated in said third cavities respectively and which are magnetized in a manner that fluxes of said permanent magnets in said first, second and third cavities intensify each other in respective interpole core portions.

41. A reluctance type rotating machine as claimed in claim 40, wherein said permanent magnets in said first and third cavities are ferrite magnets, while said permanent magnets in said second cavities are rare earth magnets.

42. A reluctance type rotating machine as claimed in claim 35 or 37, wherein said permanent magnets in said first and third cavities are bond magnets made of magnetic powder and resin, while said permanent magnets in said second cavities are rare earth magnets.

43. A reluctance type rotating machine as claimed in claim 1, wherein said rotor core has a plurality of first cavities formed along respective pole-axes of said magnetic poles and a plurality of second cavities formed along outer peripheries of said interpole portions, said first and second cavities being oblong-shaped, and said permanent magnets are arranged only in said second cavities.

44. A reluctance type rotating machine as claimed in claim 43, wherein said rotor core further includes a plurality of third cavities which are oblong-shaped in said interpole portions respectively and which are positioned radially inside said first cavities so as to define a generally rectangular area surrounded by said first, second and third cavities in each of said interpole portions.

45. A reluctance type rotating machine as claimed in claim 44, further comprising non-magnetic materials which are accommodated in said first and third cavities, respectively.

46. A reluctance type rotating machine as claimed in claim 45, wherein said non-magnetic materials are conductive of electricity.

47. A reluctance type rotating machine as claimed in claim 1, wherein said rotor core has a plurality of first cavities formed along respective pole-axes of said magnetic poles and a plurality of second cavities formed along outer peripheries of said interpole portions, said first and second cavities being oblong-shaped, and said permanent magnets are arranged only in said first cavities and magnetized in a manner that respective fluxes generated from said permanent magnets intensify each other in said interpole portions.

48. A reluctance type rotating machine as claimed in claim 47, wherein said rotor core further includes a plurality of third cavities which are oblong-shaped in said interpole portions respectively and which are positioned radially inside said first cavities so as to define a generally rectangular area surrounded by said first, second and third cavities in each of said interpole portions.

49. A reluctance type rotating machine as claimed in claim 48, further comprising non-magnetic materials which are accommodated in said second and third cavities, respectively.

50. A reluctance type rotating machine as claimed in claim 49, wherein said non-magnetic materials are conductive of electricity.

51. A reluctance type rotating machine as claimed in claim 1, further comprising magnetic end rings which are arranged on both axial ends of said rotor core, respectively.

52. A reluctance type rotating machine as claimed in claim 51, wherein a clearance is defined between each axial end of said rotor core and each of said magnetic end rings.

53. A reluctance type rotating machine as claimed in claim 1, wherein said permanent magnets is magnetized in a circumferential.

54. A reluctance type rotating machine as claimed in claim 53, wherein each of said permanent magnets is arranged on each side face of said magnetic poles in the circumferential direction of said rotor and said permanent magnets on both side of said are magnetized in the same direction.

55. A reluctance type rotating machine as claimed in claim 1, wherein said a width of each of said magnetic poles is 0.3 to 0.5 times as long as a pole pitch of said magnetic poles.

56. A reluctance type rotating machine as claimed in claim 1, wherein said a width of each of said magnetic poles is 0.3 to 0.35 times as long as a pole pitch of said magnetic poles.

* * * * *